(12) United States Patent
Wischnewskij et al.

(10) Patent No.: US 8,253,304 B2
(45) Date of Patent: Aug. 28, 2012

(54) ULTRASONIC LINEAR DRIVE UNIT COMPRISING A HOLLOW CYLINDRICAL OSCILLATOR

(75) Inventors: Wladimir Wischnewskij, Waldbronn (DE); Alexej Wischnewskij, Woerth (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 147 days.

(21) Appl. No.: 12/734,518

(22) PCT Filed: Nov. 3, 2008

(86) PCT No.: PCT/EP2008/064847
§ 371 (c)(1),
(2), (4) Date: Sep. 13, 2010

(87) PCT Pub. No.: WO2009/059939
PCT Pub. Date: May 14, 2009

(65) Prior Publication Data
US 2011/0018392 A1    Jan. 27, 2011

(30) Foreign Application Priority Data

Nov. 8, 2007 (DE) .......................... 10 2007 053 335
May 14, 2008 (DE) .......................... 10 2008 023 478

(51) Int. Cl.
*H01L 41/08* (2006.01)
(52) U.S. Cl. ................... 310/323.02; 310/369
(58) Field of Classification Search ............... 310/323.02
See application file for complete search history.

(56) References Cited

U.S. PATENT DOCUMENTS

| 4,400,641 A | * | 8/1983 | Vishnevsky et al. ...... 310/323.02 |
| 4,663,556 A | | 5/1987 | Kumada ........................ 310/333 |
| 4,868,446 A | * | 9/1989 | Kumada .................... 310/323.02 |
| 4,893,047 A | * | 1/1990 | Honda ...................... 310/323.02 |
| 4,894,578 A | * | 1/1990 | Honda ...................... 310/323.02 |

(Continued)

FOREIGN PATENT DOCUMENTS

| DE | 35 00 607 C2 | 7/1985 |
| DE | 693 25 972 T2 | 4/2000 |
| DE | 102004059429 | 3/2006 |
| EP | 0359875 | 3/1990 |
| EP | 0 600 484 A1 | 8/1994 |

OTHER PUBLICATIONS

International Search Report (in English) dated Aug. 4, 2009; the International Preliminary Report on Patentability (in English) and Written Opinion (in English) dated Jun. 1, 2010. International Search Report (in English) the International Preliminary Report on Patentability (in English) and Written Opinion (in English).

*Primary Examiner* — Mark Budd
(74) *Attorney, Agent, or Firm* — Gerald T. Bodner

(57) ABSTRACT

The invention relates to an ultrasonic linear drive unit comprising a driving element as an ultrasonic oscillator with two generators for ultrasonic vibrations and a driven element that forms a frictional contact with the driving element, and an electrical excitation source for the driving element. According to the invention, the ultrasonic oscillator is designed as a hollow thin-walled piezoelectric cylinder, the height H of which is identical to or smaller than the mean diameter D thereof. The generators for ultrasonic vibrations are symmetrically disposed on both sides relative to the sectional plane S that extends through the center of the height of the ultrasonic oscillator, perpendicular to the longitudinal axis L thereof. The cylinder surface of the driving element is in contact with the driven element, and the electrical excitation source is connected to the ultrasonic linear drive unit in such a way that the drive unit excites only the first or the second generator for ultrasonic vibrations.

20 Claims, 19 Drawing Sheets

U.S. PATENT DOCUMENTS

| | | | |
|---|---|---|---|
| 5,008,581 A * | 4/1991 | Kumada et al. | 310/323.02 |
| 5,332,941 A * | 7/1994 | Honda | 310/323.02 |
| 5,633,553 A | 5/1997 | Suzuki | 310/323 |
| 6,140,750 A * | 10/2000 | Ueyama | 310/369 |
| 7,795,782 B2 * | 9/2010 | Wischnewskij et al. | 310/323.17 |
| 7,915,787 B2 * | 3/2011 | Negishi et al. | 310/323.02 |
| 2008/0297001 A1 * | 12/2008 | Wischnewskij et al. | 310/323.06 |
| 2009/0009032 A1 | 1/2009 | Wischnewskij et al. | 310/323.02 |

* cited by examiner

ULTRASONIC LINEAR DRIVE UNIT COMPRISING A HOLLOW CYLINDRICAL OSCILLATOR

The present invention relates to an ultrasonic linear drive system according to the preamble of claim 1, comprising a driving element as ultrasonic oscillator with two generators for ultrasonic oscillations, and a driven element which produces a frictional contact with the driving element, and an electrical excitation source for the driving element. Such ultrasonic linear drives are suited for use in mobile end user devices such as cameras, mobile phones or similar miniaturized devices, inter alia, in order to allow the position-controlled alignment of optical systems.

Ultrasonic drive systems are known in the prior art. Document U.S. Pat. No. 5,633,553 discloses an ultrasonic linear drive for optical systems, in which the driving element rotating a disc-shaped rotor is formed by a cylindrically shaped ultrasonic oscillator. In the drive, the transformation of the rotational motion of the rotor into a forward motion of the mobile element is accomplished by a pair of crossed helical gears. The incorporated pair of crossed helical gears increases the volume required for the drive. This renders the construction and the miniaturization of the apparatus more difficult, increases the friction losses, increases the acoustic noise level as well as the production costs for such a drive.

Document DE 2004 059 429 B4 discloses an ultrasonic linear motor for optical systems, in which the driving element is formed by a plate-shaped ultrasonic oscillator. The mobile elements of the ultrasonic linear motor are formed by rotors which move linearly on the lateral surfaces of the ultrasonic oscillator, thereby transferring the linear motion to the mobile element of the apparatus.

The drawback of this ultrasonic linear drive is that the plate-shaped ultrasonic oscillator requires a relatively great volume, which amounts to about ⅓ to ¼ of the volume of the optical system. Moreover, the height of the ultrasonic oscillator of this drive has to be equal to or greater than the triple length of the pushers. This increases the construction height of the optical system, which reduces the possibilities of miniaturizing the optical system so that such drives cannot be used in flat and mobile end user devices such as mobile phones and similar devices, which frequently have housing heights of less than 8 mm.

Also, such a drive only has a small holding force, with the consequence that already the impact of small external shocks leads to a displacement of the rotors. This results in a defocusing of the optical system, i.e. in a reduction of the operational reliability of the drive. For this reason, corresponding apparatus are often usable to a limited extent only or not at all if oscillations occur, which limits the possibilities to use ultrasonic drive systems.

Furthermore, the ultrasonic oscillators employed in these drives have a high operating frequency in the range of 300 to 1200 KHz. At these high frequencies the oscillation amplitude is in the range between 0.4 to 0.1 micrometers. With such small oscillation amplitudes, therefore, smoothed rotors can be used, which are made of hard materials such as steel, glass or ceramics. The production technology for such rotors is complicated, however, which renders these rotors relatively expensive and leads to increased production costs for the drives as such. Moreover, small excitation levels of the oscillators with correspondingly small oscillation amplitudes of the ultrasonic oscillators have a negative influence on the uniformity of the motion of the rotors. This reduces the positioning accuracy of the drive. Also, the high operating frequencies of the ultrasonic oscillators increase the losses in the electric excitation component of the ultrasonic oscillator.

Therefore, it is the object of the present invention to reduce the volume of the drive apparatus and the construction height thereof, and to ensure a greater holding force, a higher stopping accuracy as well as a greater reliability during the operation. Additional objects of the present invention are providing a more simple technology for the cost-efficient production of such ultrasonic linear drives, reducing electrical losses in the electric excitation component as well as reducing the acoustic noises during operation, so as to allow the use of such improved ultrasonic linear drives in a greater operative range than in the past.

Therefore, the present invention is based on the object to improve an ultrasonic linear drive of the aforementioned type to reduce the problems and drawbacks known from the prior art and discussed above and to provide the ultrasonic linear drive with new and advantageous properties along with an easier realization.

According to the invention this object is achieved with an ultrasonic linear drive of the aforementioned type, wherein the ultrasonic oscillator is configured as a hollow thin-walled piezoelectric cylinder, the height H of which is equal to or smaller than the mean diameter D thereof, and the generators for ultrasonic oscillations are symmetrically disposed on both sides relative to the sectional plane S which extends through the center of the height of the ultrasonic oscillator perpendicular to the center line L thereof, and wherein the cylinder surface of the driving element is in contact with the driven element and the electrical excitation source is connected to the ultrasonic linear drive to excite only the first or the second generator for ultrasonic oscillations.

Preferred embodiments of the invention are defined in dependent claims 2 to 16.

Preferably, two different embodiments are provided for the ultrasonic linear drive according to the invention, with which all subsequent and advantageous embodiments of the drive according to the invention can be equipped. In the ultrasonic linear drive according to the invention the driving element can enter into a frictional contact with the driven element corresponding to the features in the characterizing clause of patent claim 1 either by its inner cylindrical surface or by its outer cylindrical surface. Thus, the holding force, the accuracy of the drive and its operational reliability are enhanced.

In a first preferred embodiment of the drive according to the invention each of the two generators for ultrasonic oscillations may be configured as an excited ring electrode and a general ring electrode, wherein the excitation electrodes are disposed on one of the cylindrical surfaces of the radially polarized oscillator, symmetrically on both sides of the sectional plane, and the general electrode is disposed underneath the excitation electrodes on the other cylindrical surface of the oscillator. This allows a volume excitation of the oscillator.

Moreover, each of the two generators for ultrasonic oscillations may be configured as an excited ring electrode and a general ring electrode, wherein the excitation electrodes are disposed on one of the cylindrical surfaces of the longitudinally polarized oscillator near the end faces and symmetrically with respect to the sectional plane, and the general electrode is disposed on the same surface of the oscillator in the sectional area of its sectional plane. This allows a surface excitation of the oscillator.

In another advantageous embodiment of the drive each of the generators for ultrasonic oscillations is configured in the form of alternately disposed strip-shaped electrodes, which are disposed on a cylindrical surface of the oscillator alternately polarized in the longitudinal direction. The use of strip-shaped electrodes in connection with a surface excitation of the oscillator allows a reduction of the necessary excitation voltage.

In another advantageous embodiment of the drive each of the generators for ultrasonic oscillations is comprised of coaxially disposed disc-shaped electrodes, which take turns with thin disc-shaped layers of piezoelectric ceramics polarized in the longitudinal direction. Thus, it is possible to increase the excitation efficiency along with a simultaneous reduction of the excitation voltage.

In another advantageous embodiment of the drive each of the generators for ultrasonic oscillations may be formed of an even number of alternate active and passive sections. Thus, it is possible to generate bending oscillations in the oscillator, which improves the function of the drive. In addition, the ultrasonic oscillator may have an abrasion-resistant layer on one of its cylindrical surfaces which enters into a frictional contact with the driven element, or the ultrasonic oscillator may have one or two annular friction elements by means of which it produces a frictional contact with the driven element, or the ultrasonic oscillator may have one or more segment-shaped friction elements by means of which it produces a frictional contact with the driven element. This permits an increase of the working resources of the drive.

In all of the described and advantageous embodiments of the ultrasonic linear drive the driven element may have the shape of a round rod or a tube, or parts of the round rod or the tube or of the longitudinally cut round rod or the longitudinally cut tube or longitudinally cut parts of the round rod or longitudinally cut parts of the tube, respectively, may have this or another suitable shape. This broadens the constructive design possibilities for the drive.

In another advantageous embodiment of the drive according to the invention the driven element may be made of an abrasion-resistant plastic material. This results in a simplified technology of producing the drive.

It is provided in a possible preferred embodiment of the drive according to the invention that an optical lens or an optical lens group or another mobile part of the apparatus may be disposed inside the driven element or the driving element. This broadens the fields of application for the drive.

Moreover, in an advantageous embodiment of the drive according to the invention, the excitation source for the driving element may be configured as a self-exciting generator, whose excitation frequency is predefined by the resonance frequency of the generator for ultrasonic oscillations of the excited oscillator connected to same. This allows to stabilize the function of the drive.

Also, according to an advantageous improvement, the ultrasonic linear drive according to the invention may be equipped with a digital controller for the electrical excitation source, which predefines the position of the driven element. Thus, it is possible to exactly position the drive.

Of course, it is also possible to combine the above-described advantageous embodiments.

Below, the invention will be explained in more detail by means of embodiments with reference to the figures.

EMBODIMENT

Figure 1:
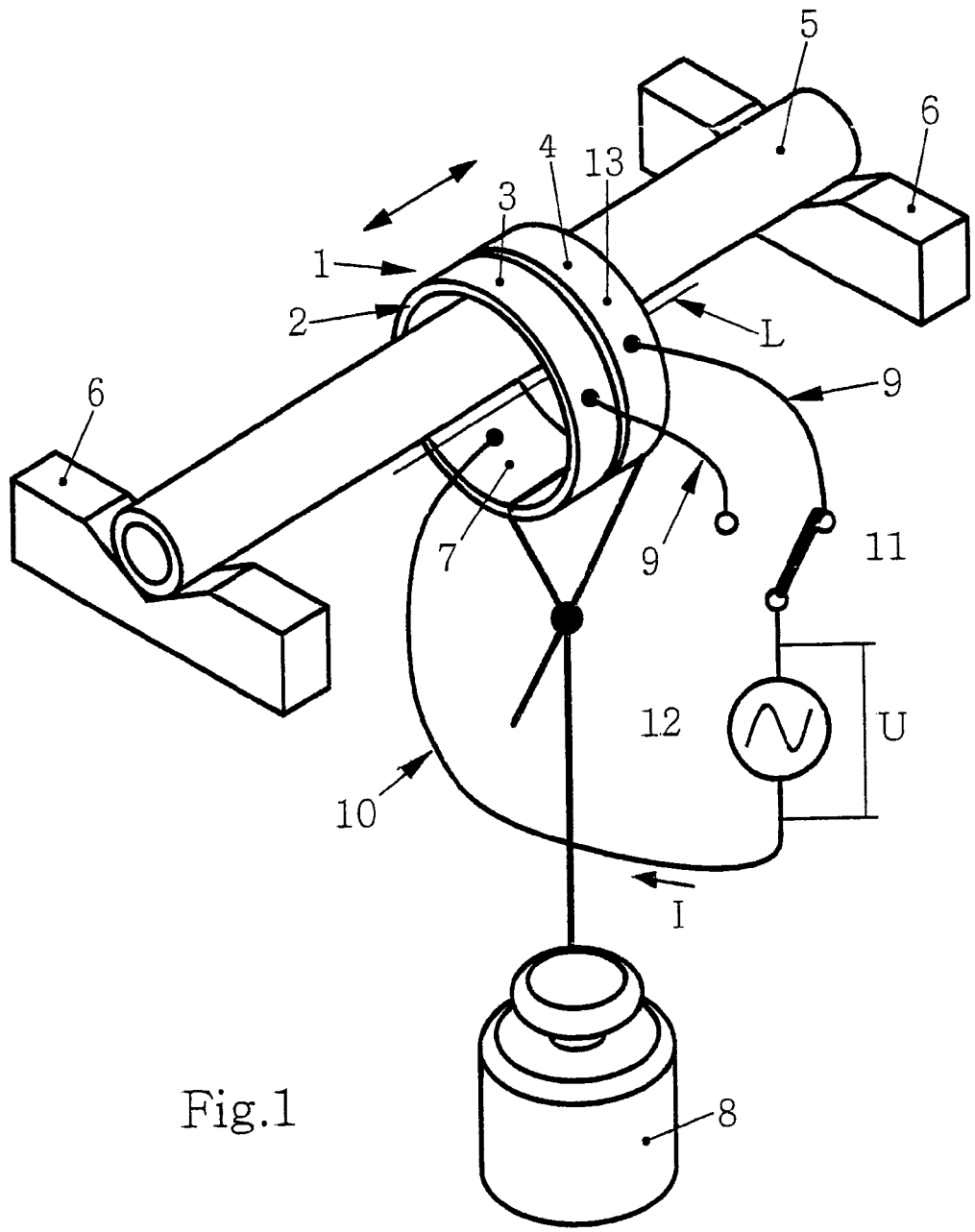
FIG. 1 shows a schematic representation of the ultrasonic linear drive according to the invention.

FIG. 1 shows a schematic representation of the ultrasonic linear drive according to the invention in order to explain the constructive realization. The drive comprises the driving element 1, configured as ultrasonic oscillator 2 with two generators for ultrasonic oscillations 3, 4 and the driven element 5 disposed on two supports 6. The driving element 1 produces a frictional contact with the inner cylindrical surface 7 of the driven element 5, which is at the same time the inner cylindrical surface of the oscillator 2. The driving element 1 is pressed against the driven element 5 by the load 8.

Each of the generators for ultrasonic oscillations 3 and 4 is connected to the electrical excitation source 12 by means of the connections 9, 10 via the direction selector switch 11. The direction selector switch 11 is configured in such a way that the excitation source 12 can only excite either generator 3 or generator 4. The electrical excitation voltage U is applied only to generator 3 or to generator 4, with current I flowing through the generator 3 or 4.

Figure 2:
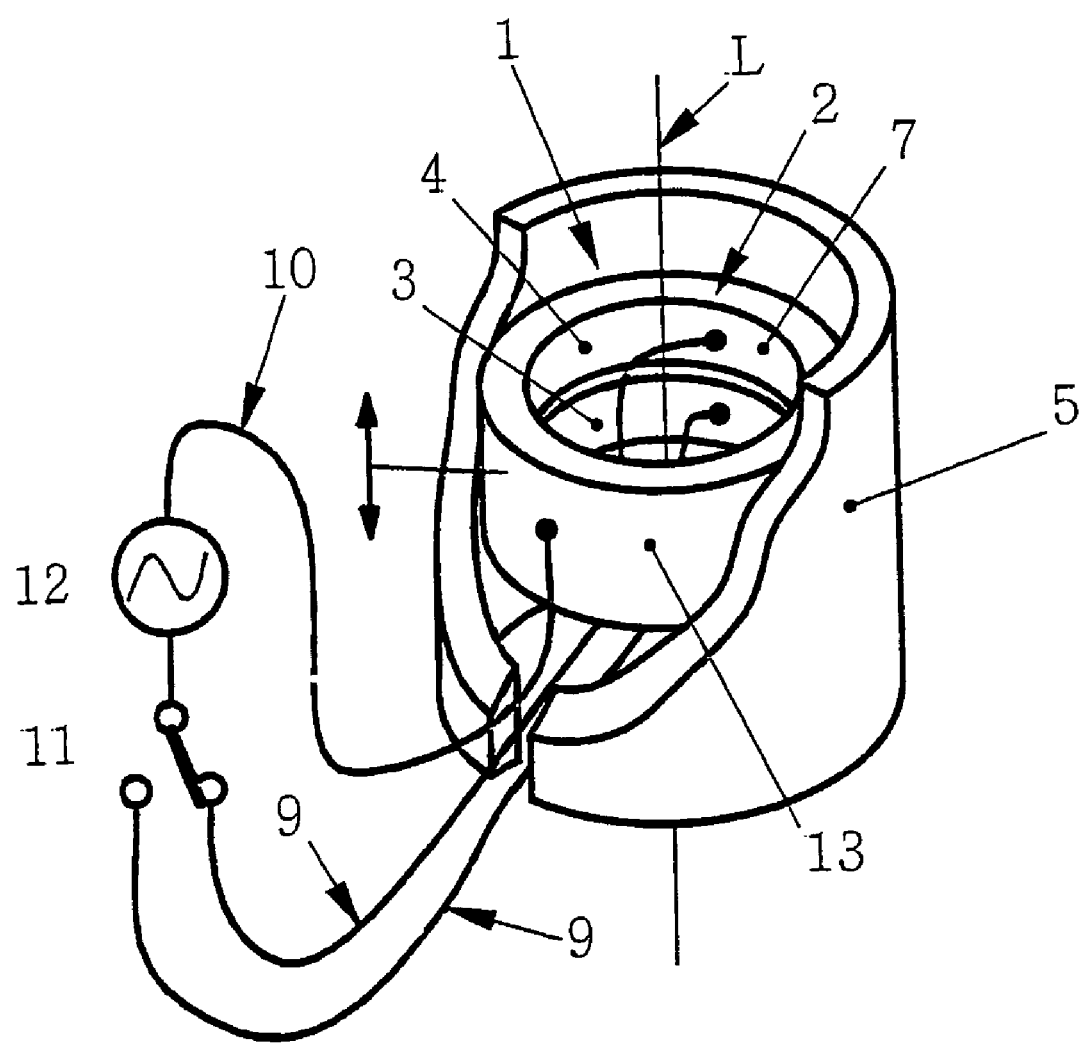
FIG. 2 shows a first embodiment of the drive according to the invention.

FIG. 2 shows a first embodiment of the drive according to the invention, in which the driving element 1 enters into a frictional contact with the outer cylindrical surface 13 of the driven element 5, which is at the same time the outer cylindrical surface of the oscillator 2. The contact force of the driving element 1 against the driven element 5 is generated by the clamping force of the driven element 5.

Figure 3:
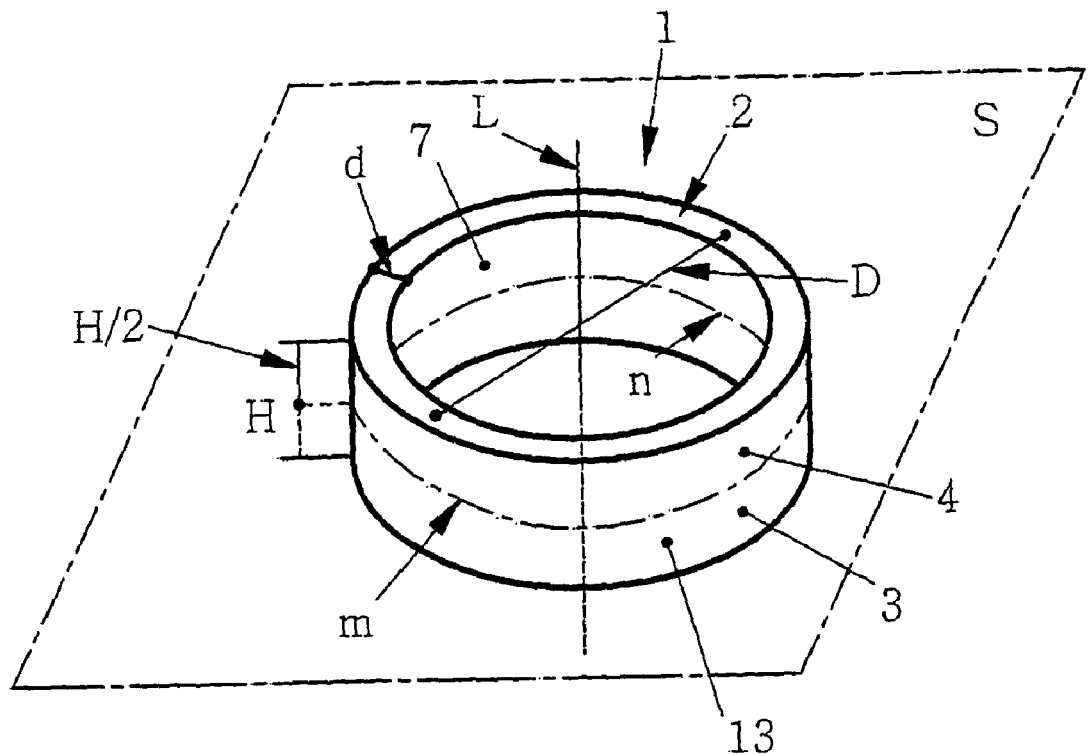
FIG. 3, 4 show schematic representations to explain the oscillator construction.
Figure 4:
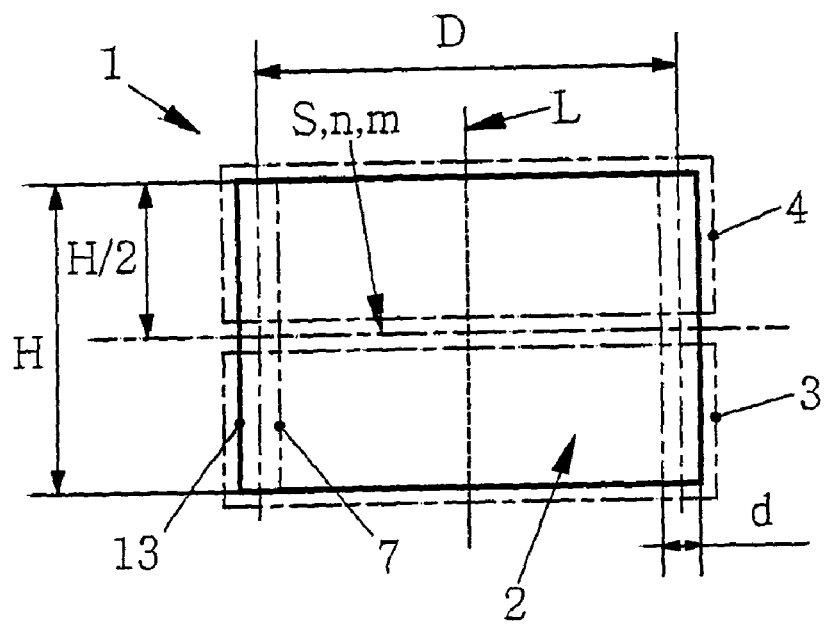

In the embodiment according to the invention the driving element 1, i.e. the oscillator 2, is configured as a hollow thin-walled piezoelectric cylinder, the height H of which is equal to or smaller than the mean diameter D, as is shown in FIGS. 3 and 4. In practice, the height H may vary within the range of H=D to H=D/5. However, a drive having a height smaller than D/5 is technologically hard to realize.

The concept of a thin-walled cylinder implies that the wall thickness d of the cylinder is approximately 5 to 20 times smaller than its mean diameter D. The thin-walled piezoelectric cylinder of the oscillator 2, i.e. the driving element 1, has a center line L. The generators for ultrasonic oscillations 3 and 4 are disposed on the ultrasonic oscillator 2 symmetrically relative to the sectional plane S, which extends through the center of the height H of the oscillator 2 and perpendicular to the center line L thereof.

In FIGS. 3 and 4 the dash-dotted lines m and n show the markings for the line intersecting with the sectional plane S of the oscillator 2.

Figure 5:
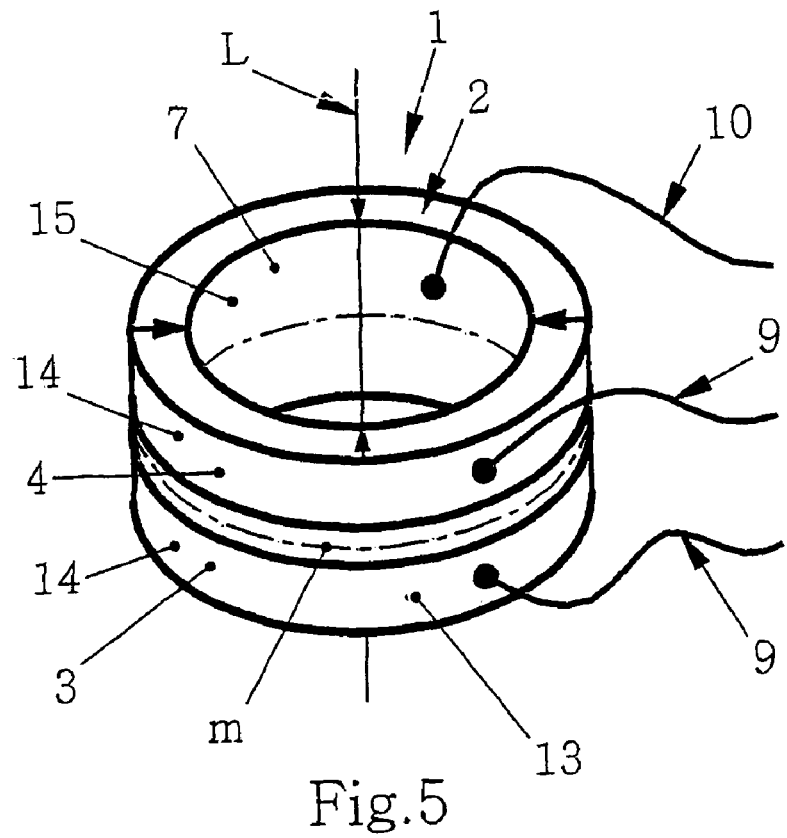
FIG. 5, 6, 7, 8, 9 show other embodiments of ultrasonic oscillators.
Figure 6:
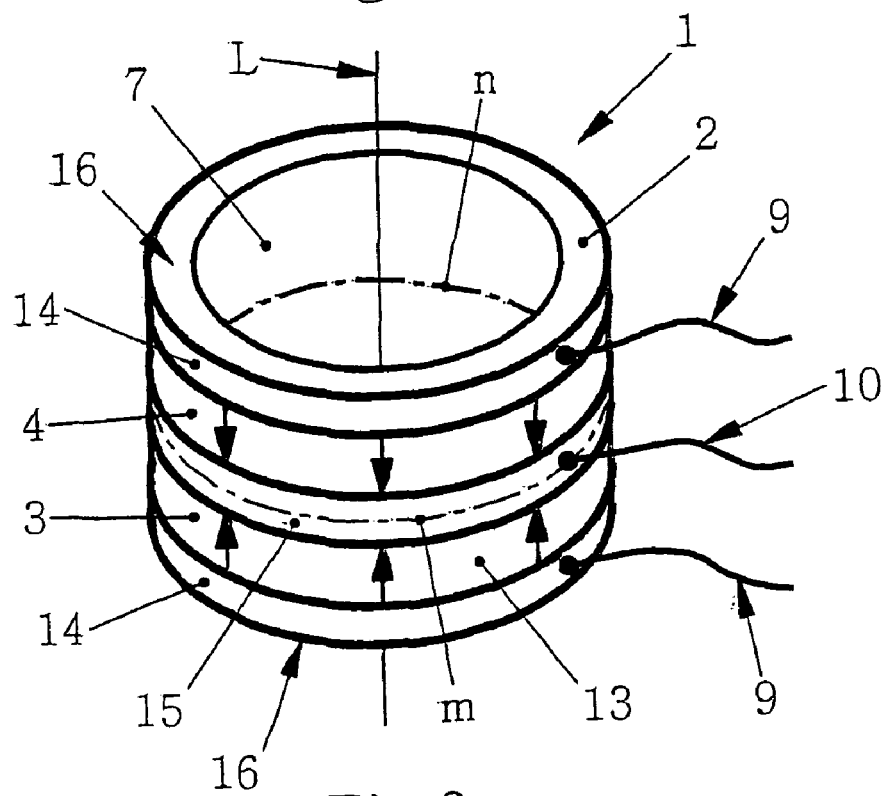

FIGS. 5 and 6 show that each of the generators for ultrasonic oscillations 3 and 4 in the form of a thin annular excitation electrode 14 and the general electrode 15 between these electrodes can be configured as a piezoelectrically disposed ceramics. Such electrodes can be realized, for example, by vapor-depositing chromium-copper-nickel layers, by chemical deposition or by burning silver into the cylindrical surfaces 7, 13 of the oscillator 2.

FIG. 5 shows another embodiment of the oscillator 2, in which the excitation electrodes 14 are disposed on the outer cylindrical surface, symmetrically on both sides of the sectional plane S. The general electrode 15 is disposed on the inner cylindrical surface 7 of the oscillator 2, underneath the excitation electrodes 14.

As can also be seen in FIG. 5 it is possible with the oscillator 2 that the excitation electrodes 14 be disposed on its inner cylindrical surface 7 and that the general electrode 15 be disposed on the outer cylindrical surface 13 (not illustrated in FIG. 5). In both cases the polarization of the piezoelectric ceramics of the oscillator 2 then has to take place in a radial direction, as is shown by arrows in FIG. 5.

FIG. 6 shows that the excitation electrodes 14 can be disposed on the outer cylindrical surface 13 of the oscillator 2 near its end faces 16, with the general electrode 15 being on the same surface at the point of intersection of the oscillator 2 with the sectional plane S, line m. Alternatively, the excitation electrodes 14 can also be disposed on the inner cylindrical surface 7 of the oscillator near its end faces 16. The general electrode 15 is located on the same surface at the point of intersection of the oscillator 2 with the sectional plane S, line n (not illustrated in FIG. 6). In these two cases the polarization of the piezoelectric ceramics of the oscillator 2 has to take place in an axial direction, as is shown by arrows in FIG. 6.

Figure 7:
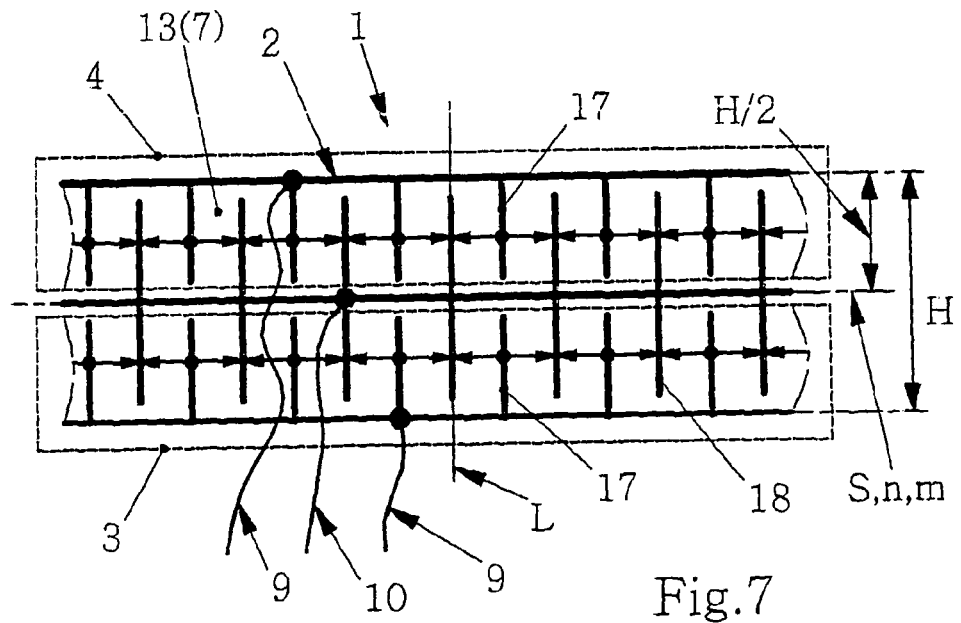

FIG. 7 shows an embodiment of the oscillator 2, in which the generators for ultrasonic oscillations 3, 4 can be configured as alternately disposed strip-shaped electrodes 17, 18, which are disposed on the outer 13 or the inner cylindrical surface 7 of the oscillator 2. FIG. 7 shows the uncoiled shell of the surface 13 or the surface 7 of the oscillator 2.

The electrode structure 17 and 18 can be produced by means of photolithography and the subsequent chemical etching of the electrodes. Moreover, each of the generators for ultrasonic oscillations may have a multilayer structure and be formed of the coaxially disposed disc-shaped excitation electrodes 19 and the general electrodes 20, which—as is shown in FIG. 8—take turns with the disc-shaped layers 21 made of piezoelectric ceramics.

Figure 8:
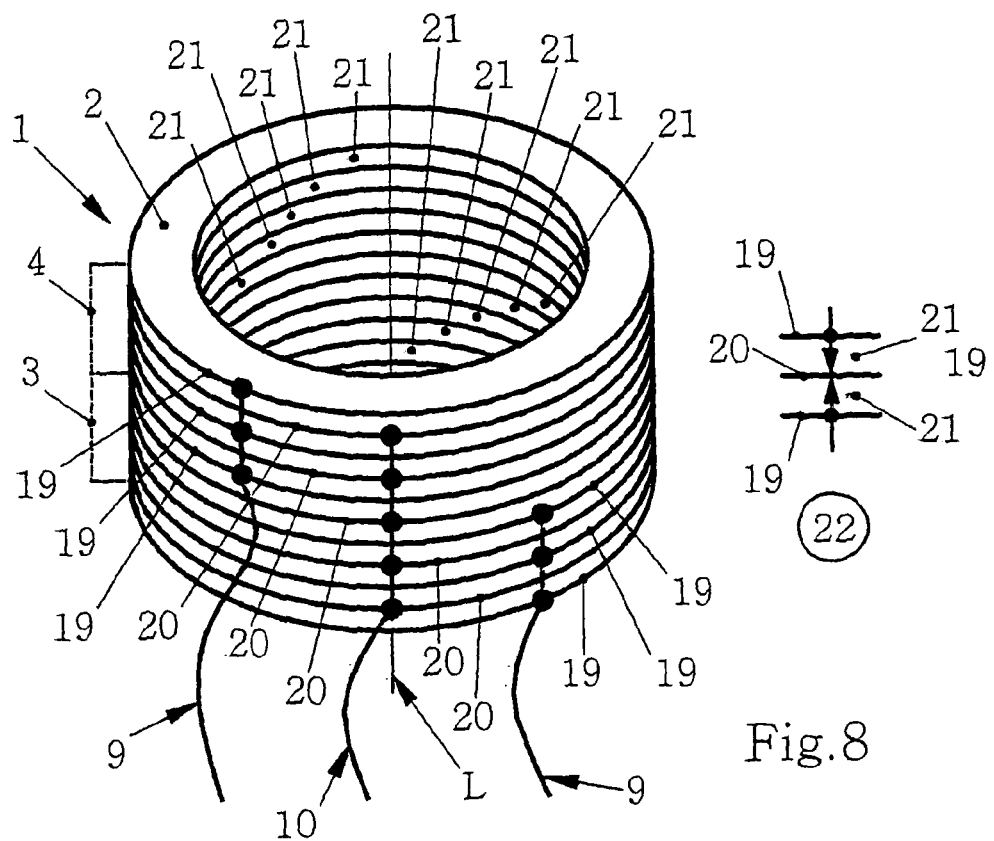

In representation 22 of FIG. 8 the arrows indicate the polarization direction of the piezoceramic layers 21. Such oscillators 2 can be manufactured by means of the multilayer technology and the high-temperature sintering of the layers.

Figure 9:
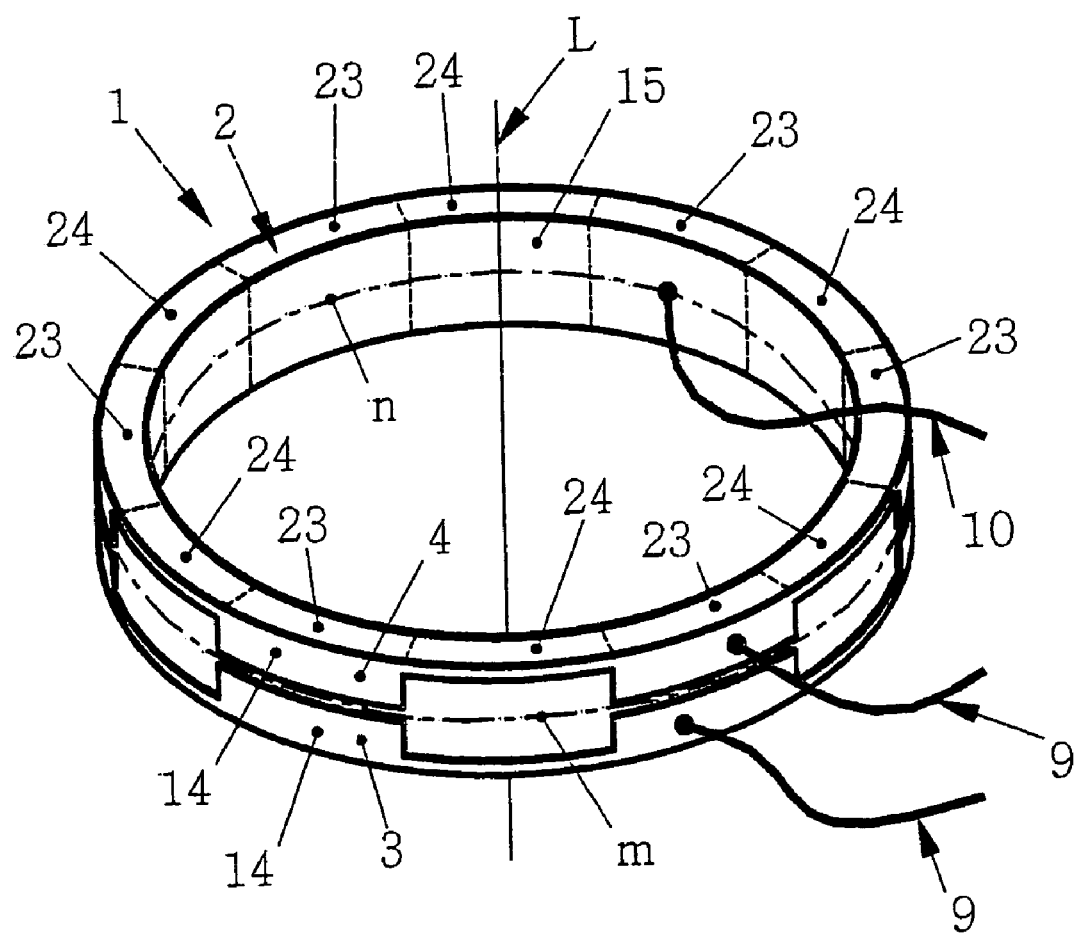
Figure 10:
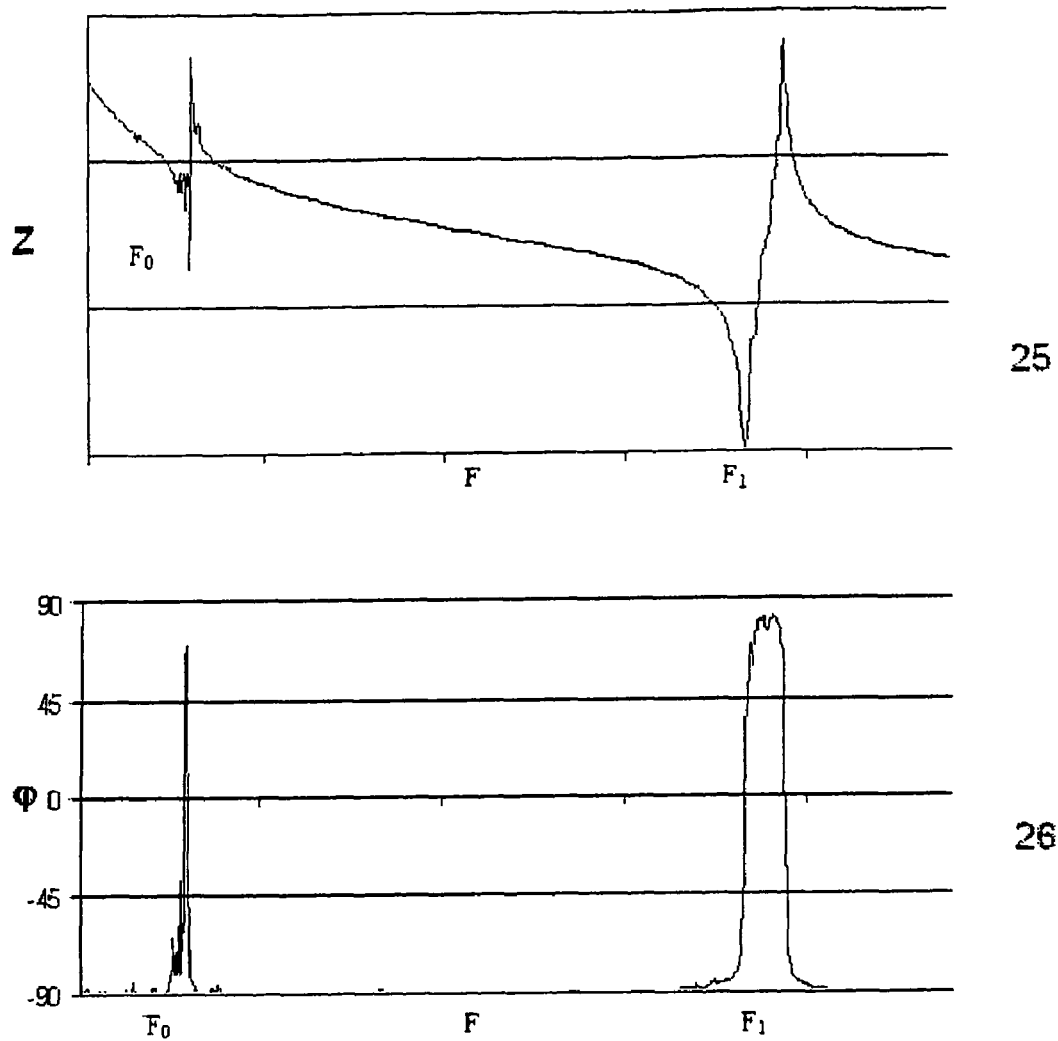
FIG. 10 shows the frequency dependences of an oscillator.

Each of the ultrasonic generators 3, 4 may be formed of an even number of active 23 and passive sections 24. An example of an oscillator 2 with such generators 3 is shown in FIG. 9. Representation 25 in FIG. 10 shows the frequency dependence of the resistance Z of one of the generators 3 or 4 of the oscillator 2. Representation 26 shows the frequency dependence of the phase shift φ between the first harmonic of the electrical excitation voltage U and the first harmonic of the current I flowing through the generator 3 or 4. The dependences shown in FIG. 10 relate to an oscillator 2 having the dimensions D=30.5 mm, d=2.5 mm, H=10 mm and produced from the piezoelectric ceramics LITEC-3. The lower resonance frequency $F_0$=41.00 kHz corresponds to the operating frequency of the oscillator 2, the upper resonance frequency $F_1$=191.0 kHz represents the resonance frequency of the longitudinal oscillations relative to the height H of the oscillator 2.

Figure 11:
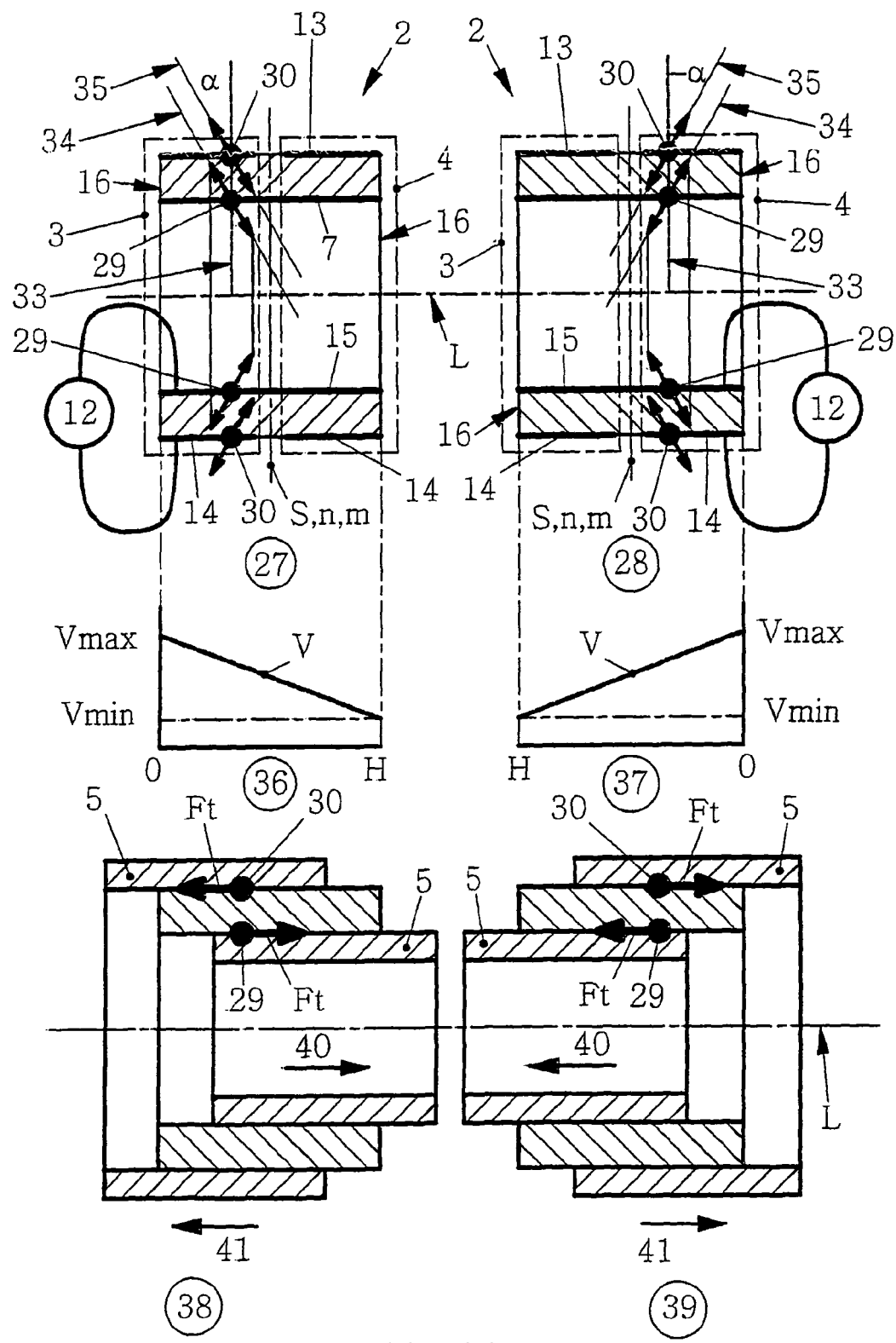
FIG. 11 shows schematic representations to explain the operating principle of the ultrasonic linear drive.

Representations 27, 28 of FIG. 11 show the radial sections of the oscillator 2. In the first case the excitation source 12 is connected to the generator 3, and in the second case the excitation source 12 is connected to the generator 4 of the oscillator 2. Points 29 and 30 represent points on the cylindrical surface 7 and 13 of the oscillator 2. Arrows 31 and 32 show the paths of motion of the oscillations of points 29 and 30. Line 33 indicates the radial direction, line 34, 35 shows the direction of motion of points 29, 30. The angle α represents the angle of inclination of lines 34, 35 with respect to the radial direction, i.e. with respect to line 33.

In representations 36, 37 of FIG. 11 the dash-dotted line shows the graphical dependence of the oscillation speed V of the points of the cylindrical surface 7 or 13 of the oscillator 2 on their position lengthways of height H. The maximum of the oscillation speed $V_{max}$ is near the end faces 16 with the active generators 3 (4) of the oscillator 2. The minimum $V_{min}$ is near the end faces 16 with the passive generator 4 (3) of the oscillator 2.

In representations 38, 39 of FIG. 11 the arrows 40 and 41 indicate the directions of motion of the driven element 5 when the generator 3 or the generator 4 is excited.

Figure 12:
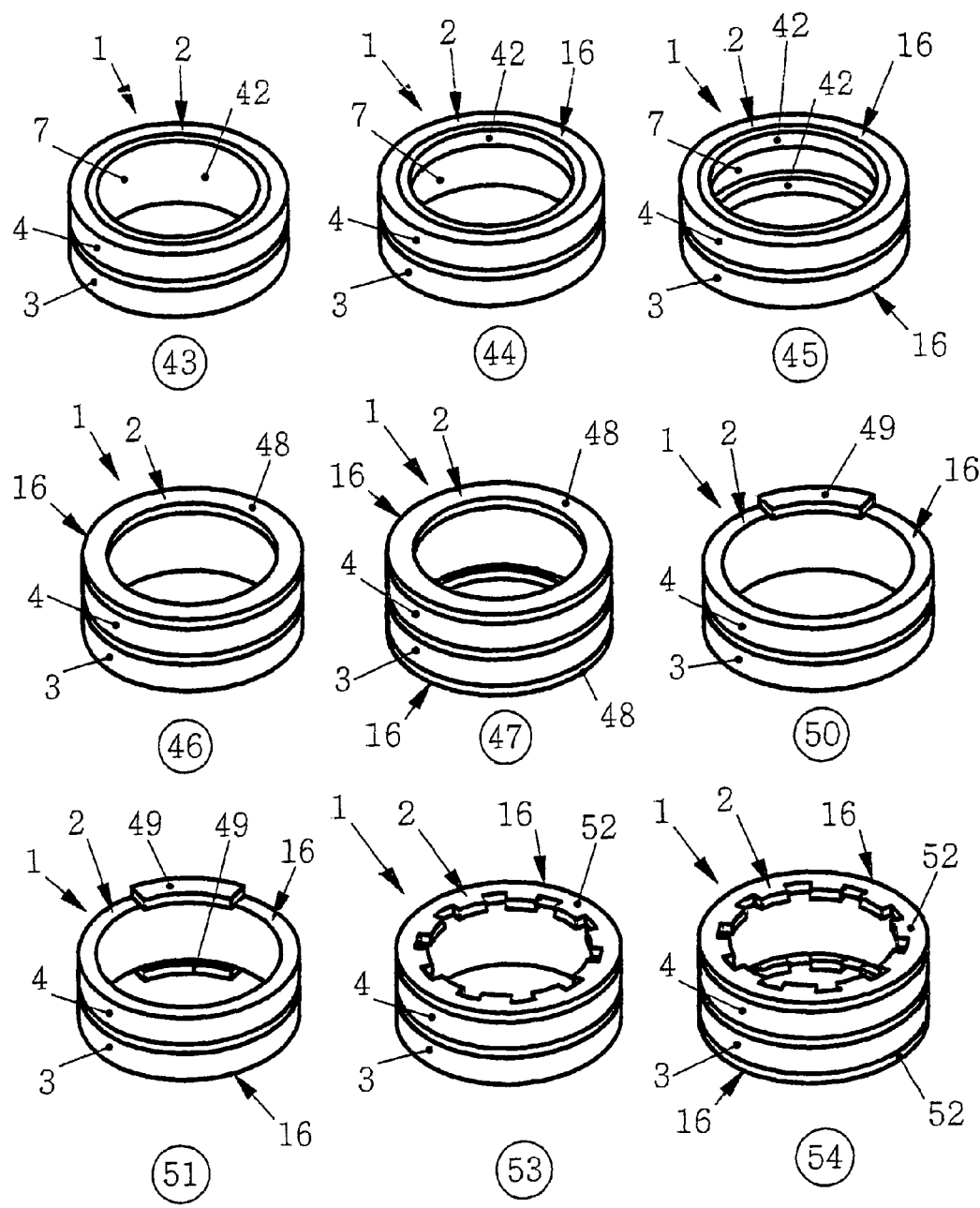
FIG. 12 shows different embodiments of friction layers and of friction elements.

FIG. 12 shows that, in the illustrated embodiment, the oscillator 2 may have a thin abrasion-resistant layer 42 in order to avoid the frictional abrasion, which layer produces a frictional contact with the driven element 5 (representation 43, FIG. 12). This layer may be applied to the entire surface 13 or 17 of the oscillator 2. The layer 42 may be disposed near one of the end faces 16 of the oscillator 2 (representation 44, FIG. 12) or near the two end faces 16 of the oscillator 2 (representation 45, FIG. 12). This layer may also be applied to the surface of the electrodes 14 or 15 and, at the same time, can assume the function of one of the electrodes 14 or 15.

The layer 42 may have a thin abrasion-resistant coating in the form of polycrystalline diamond, which is generated by vapor-deposition or precipitation from a gaseous medium, for example, with Ti, Cr, TiN, TiCN, TiC, CrN, TiAlN, ZrN, TiZrN, TiCrN or C.

Moreover, the oscillator 2 can be provided with one (representation 46, FIG. 12) or two (representation 47, FIG. 12) annular friction elements 48, by means of which it produces a frictional contact with the driven element 5.

The oscillator 2 may also comprise segment-shaped friction elements 49 (representation 50, 51, FIG. 12) or tooth-shaped friction elements 52 (representation 53, 54, FIG. 12). The friction elements 48, 49, 52 may be realized as thin plates made of $Al_2O_3$, $ZrO_2$, $Si_3N_4$ or of another solid, wear-resistant material.

The ultrasonic drive according to the invention provides for long (FIG. 13) and short (FIG. 14) driven elements 5. In the first case, the length G of the driven element 5 is selected to be greater than the height H of the oscillator 2. In the second case, the height C of the driven element is selected to be smaller than the height H of the oscillator 2. The long driven elements 5 (FIG. 13) may have the shape of a round rod 55, a tube 56, a longitudinally cut tube 57, 58, 59, 60 or a longitudinally cut part of a round rod 61 or a longitudinally cut part of a tube 62. The short driven elements (FIG. 14) may have the shape of a part of tube 63 or of parts of tube 64, 65, 66, 67, 68 with different shapes, which divide this part by grooves 69.

Both the short and the long driven elements 5 may be produced from plastic materials.

Figure 15:
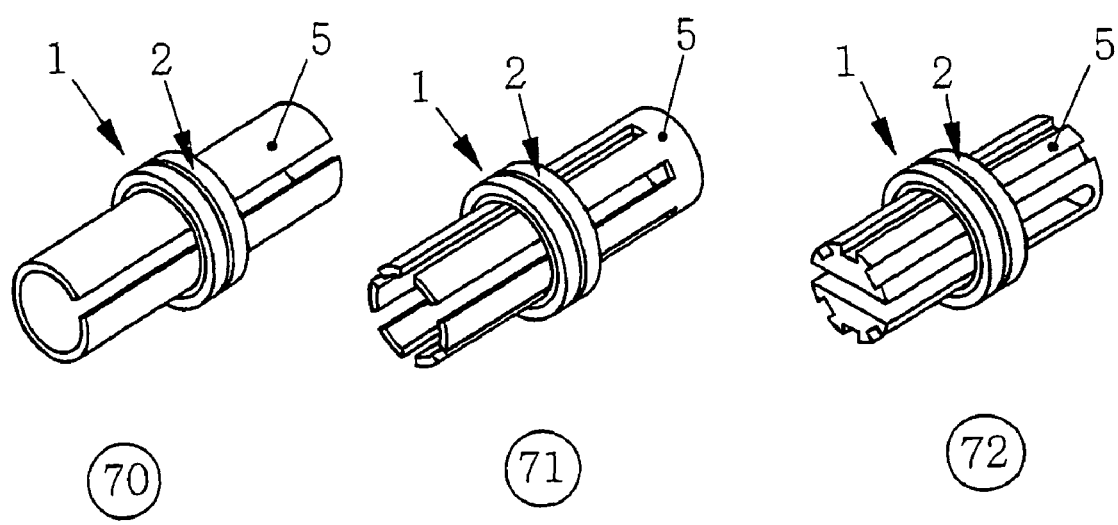
FIG. 15, 16, 17 show other different embodiments of the drive according to the invention.

Representations 70, 71, 72 in FIG. 15 show constructive embodiments of inventive drives each with a long driven element 5.

Figure 16:
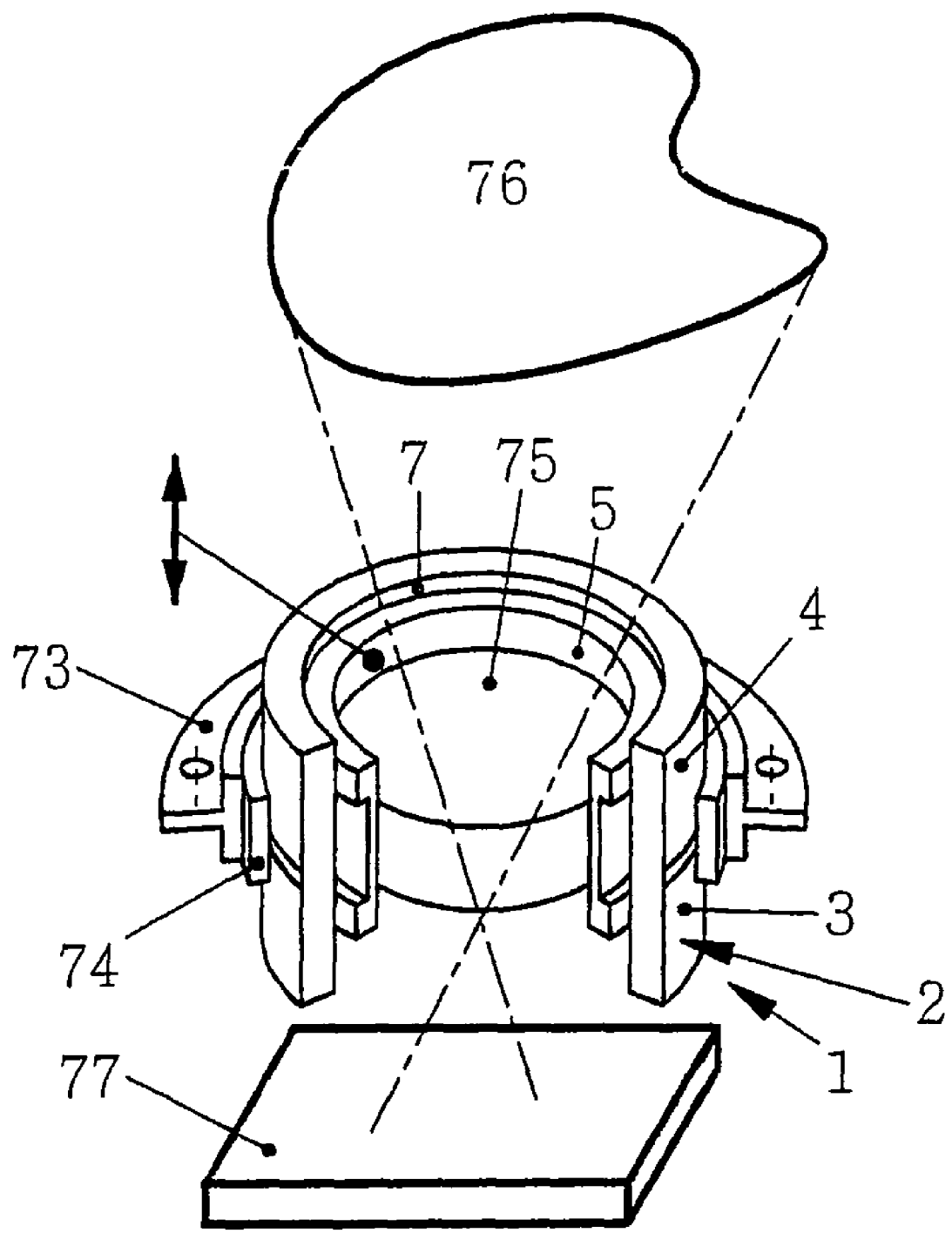

FIG. 16 shows the construction of the inventive drive with a short driven element 5. The driving element 1 and 2, respectively, of this drive is held by the holder 73 and the sound-insulating intermediate layer 74. The element produces via its inner cylindrical surface 7 a frictional contact with the driven element 5. Inside the driven element 5 an optical lens or a group of optical lenses 75 may be located, which focuses the optical object 76 to the optoelectric sensor 77.

Figure 17:
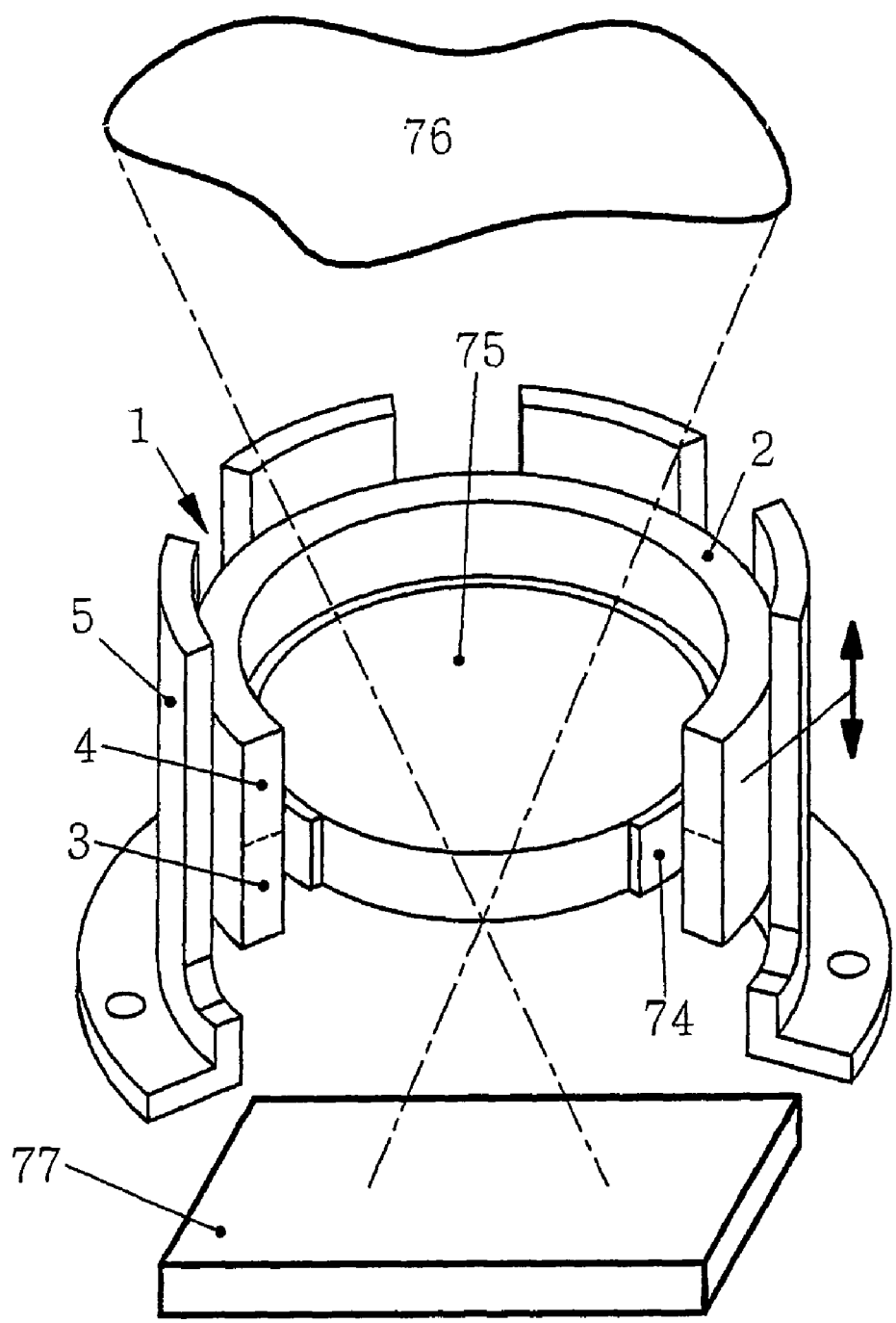

FIG. 17 shows an embodiment of a drive in which the driven element 5 is configured as an immobile part and the driving element 1 (2) as a mobile part. Inside the driving element an optical lens 75 may be located.

Figure 18:
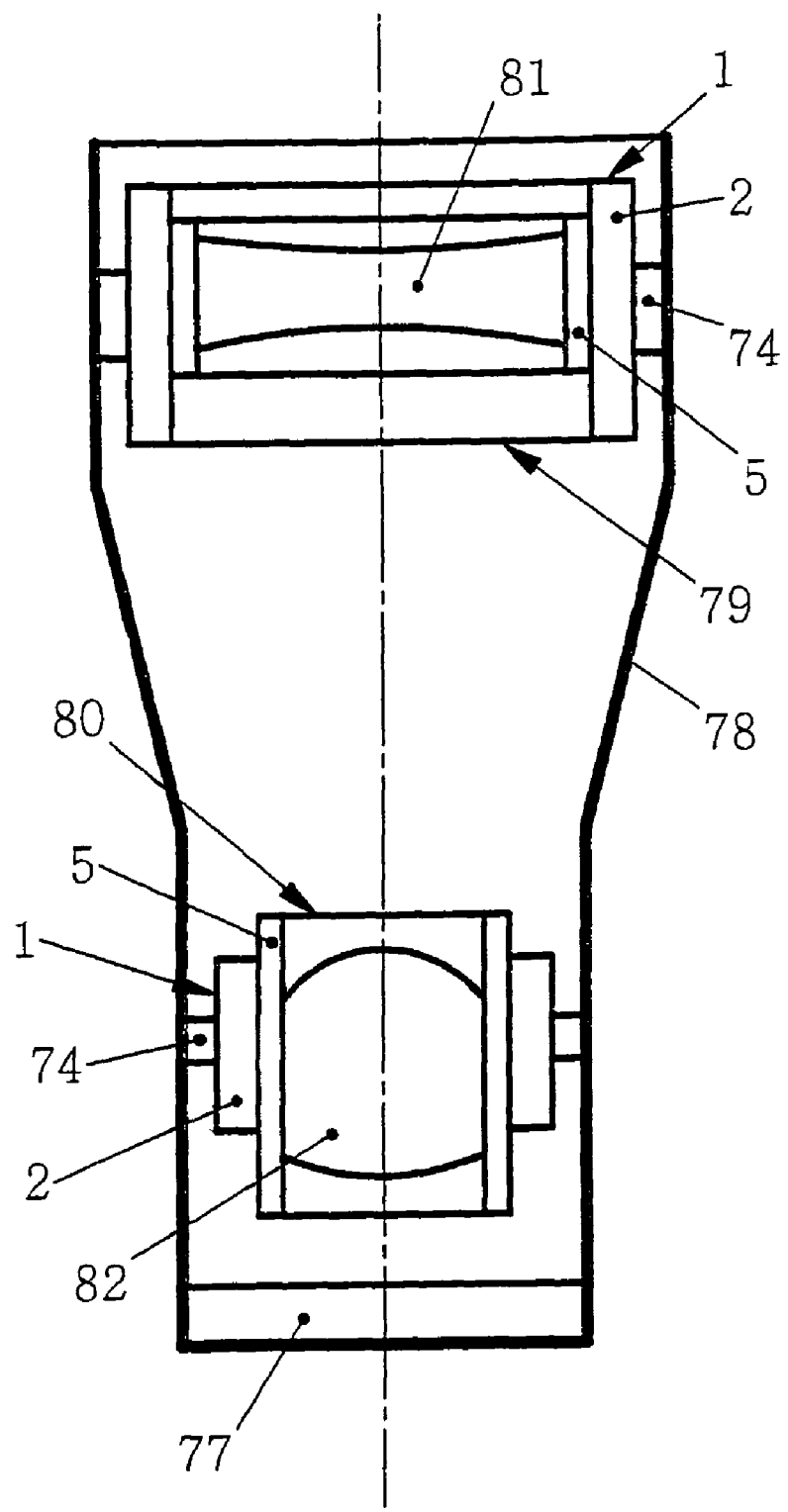
FIG. 18 shows an optical lens.

FIG. 18 shows an optical objective in housing 78, in which two ultrasonic drives 79 and 80 configured according to the proposal are coaxially disposed. The ultrasonic drive 79 actuates the focusing group of lenses 81 and the ultrasonic drive 80 actuates the zoom lens group 82.

Figure 19:
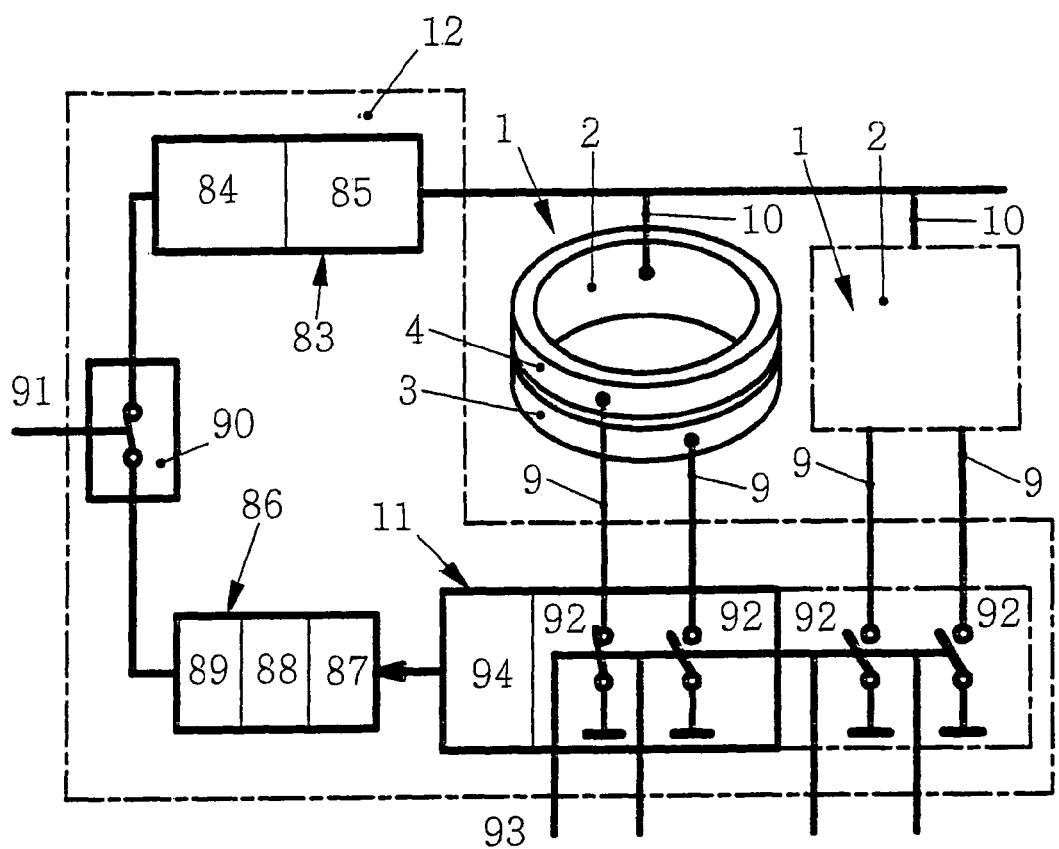
FIG. 19 shows a block diagram of the excitation source.

FIG. 19 shows a block diagram of an electrical excitation source of the driving element 1 (oscillator 2). The block diagram is formed of a power amplifier 83 comprising the amplifier component 84 and the tuning circuit 85, the feedback circuit 86 comprising the filter 87, the phase shifter 88 and the signal amplifier of the feedback circuit 89, the on-off switch of the feedback circuit 90 with control input 91, the direction selector switch 11 comprising the change-over switch 92 with one or more control inputs 93, and the signal source of the feedback circuit 94. The electrical excitation source 12 shown in FIG. 19 may be used to excite one, two or more driving elements 1.

Figure 20:
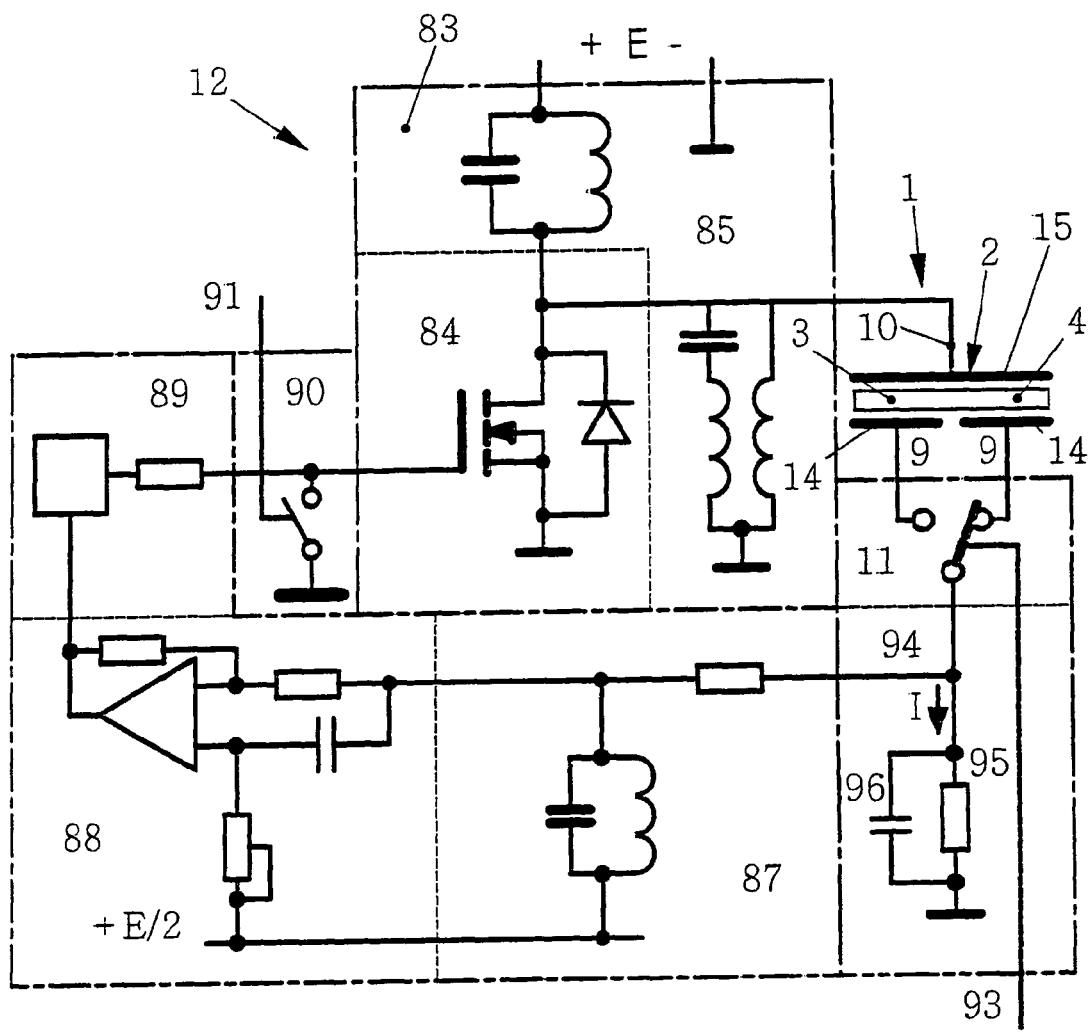
FIG. 20, 21 show a practically realized embodiment of the excitation source.

FIG. 20 shows a practically realized embodiment of an electrical excitation source 12. In this modification the signal source of the feedback circuit 94 is formed of the resistor 95 connected in parallel and the capacitor 96.

Figure 21:
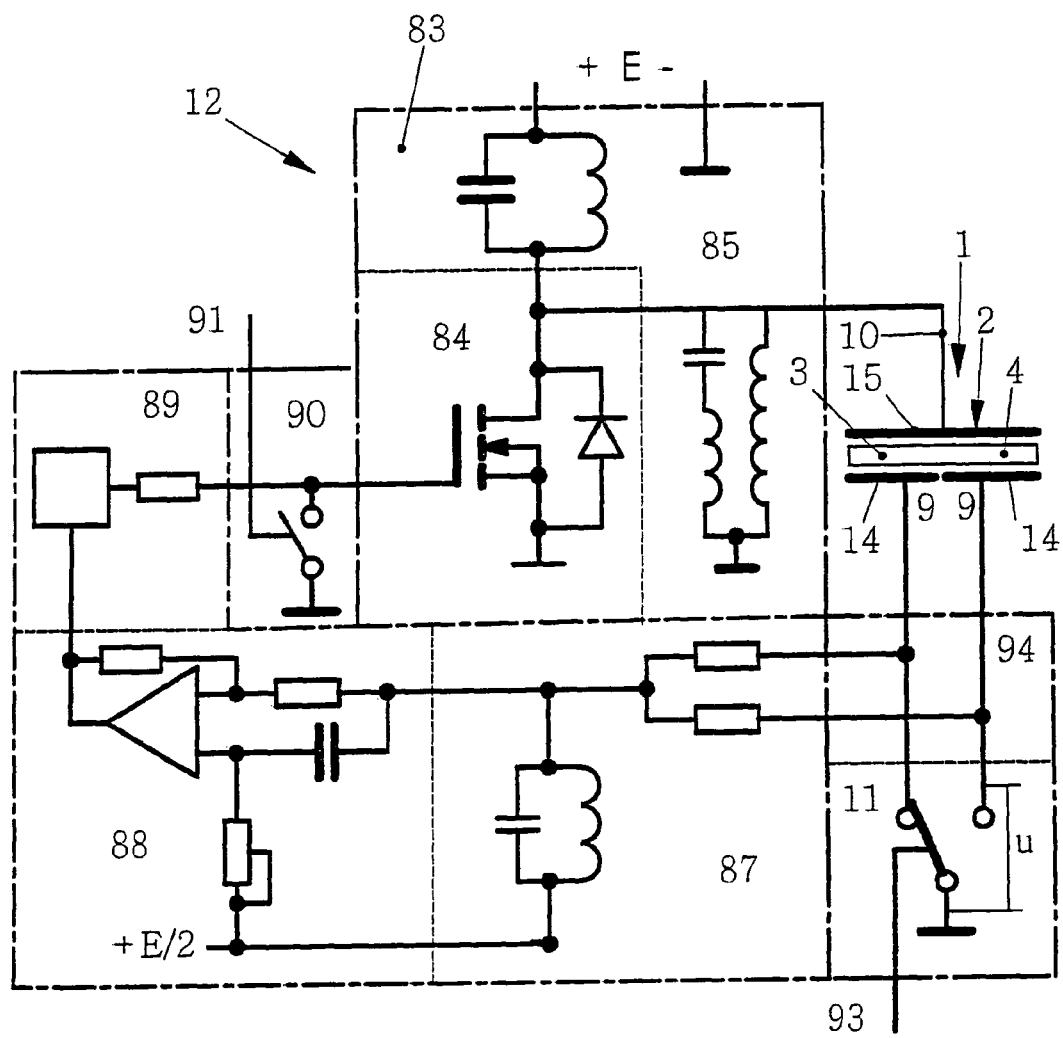

FIG. 21 shows a second practically realized embodiment of an electrical excitation source 12. In this modification the signal source of the feedback circuit 94 is formed only of the excitation electrodes 14 of the oscillator 2.

Figure 22:
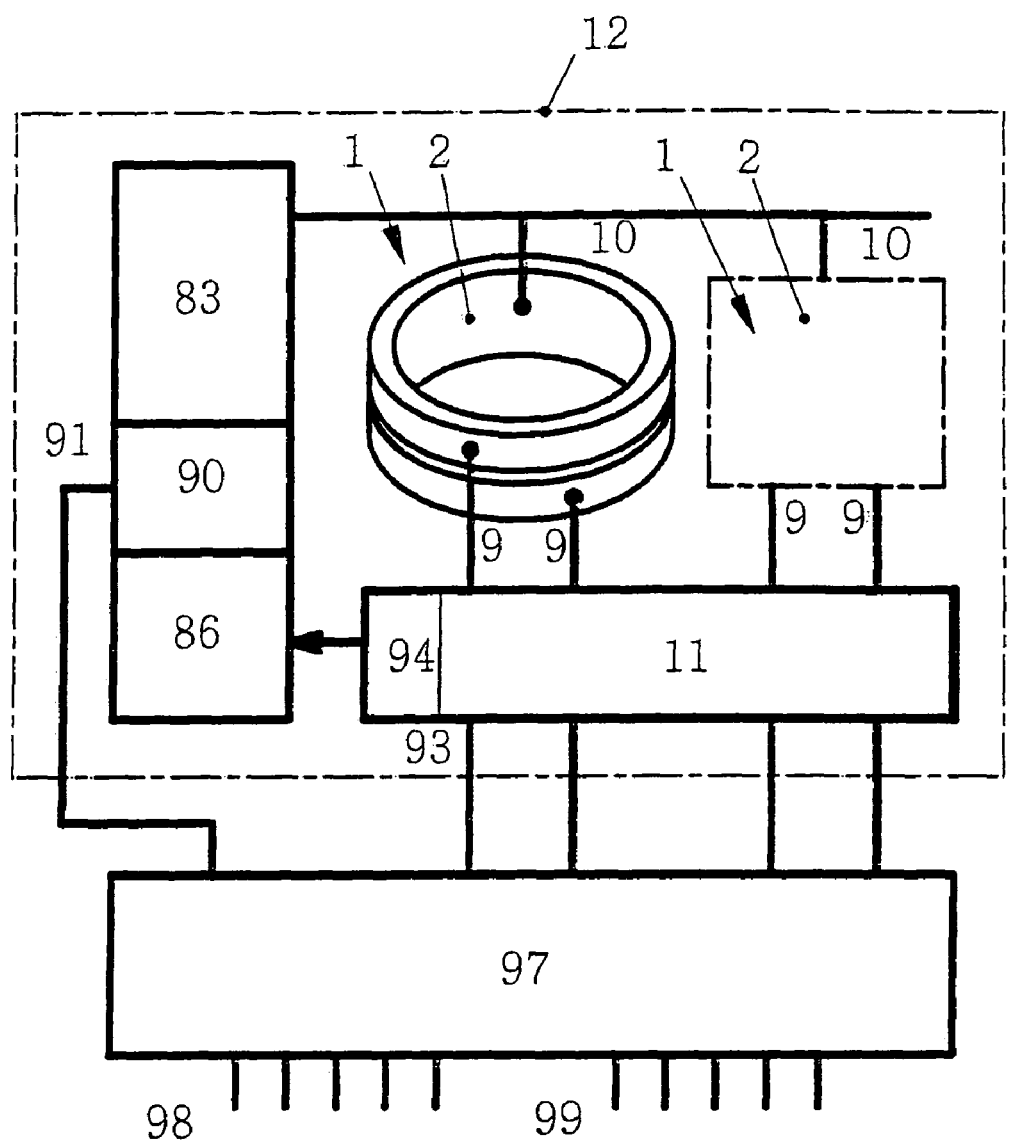
FIG. 22 shows a block diagram of the drive with a digital controller for the excitation source.

FIG. 22 shows a modification of the drive according to the invention, in which the electrical excitation source 12 is provided with a digital controller 97 predefining the position of the driving element. The digital controller 97 may have one or more control inputs 98 and one or more positioning inputs 99 which are connected to the optoelectric sensor 77 or a position generator for the driven element 5 (position generator not illustrated in FIG. 22).

Below, the operating mode of the ultrasonic linear drive according to the invention shall be explained in more detail.

The electrical excitation source 12 provides the excitation voltage U whose frequency corresponds to the operating frequency of the driving element 1. This frequency is equal to the lower resonance frequency $F_0$ of the cylindrical oscillator 1 (see FIG. 10). The excitation voltage is supplied from the excitation source 12 via the direction selector switch 11, the connections 9 and 10 to the electrodes 14 and 15 or 17 and 18 or 19 and 20 of the generator for ultrasonic oscillations 3 or 4 (see FIG. 5, 6, 7, 8, 9), with current I flowing through the generator for ultrasonic oscillations 3 or 4.

By the influence of the excitation voltage of the generator for ultrasonic oscillations 3 or 4 asymmetrical ultrasonic resonance oscillations are generated in the oscillator 2 of the driving element. The oscillating driving element 1 acts by means of the frictional contact with its inner cylindrical surface 7 or its outer cylindrical surface 13 on the driven element 5 and this causes the driven element 5 to move longitudinally relative to its center line L. The direction of motion depends on which one of the generators 3 and 4 for ultrasonic oscillations is connected to the electrical excitation source 12.

The mechanism causing the motion of the driving element 1 may be explained as follows. As the generators for ultrasonic oscillations 3 and 4 are disposed on the ultrasonic oscillator 2 symmetrically relative to the sectional plane S (m, n—lines of the sectional plane S on the cylindrical surfaces 7 and 13) which extends through the center of height H of the oscillator 2 (see FIG. 3, 4, 11) perpendicular to the center line L thereof, one of the generators for ultrasonic oscillations 3 (or 4), when excited, expands the oscillator 2 and compresses it on only one side of the sectional plane S. The second generator for ultrasonic oscillations 4 (or 3) is not excited. Therefore, the second generator for ultrasonic oscillations 3 (or 4) restricts the oscillator 2 on the other side of the sectional plane. This means that the oscillator 2 is excited asymmetrically.

As the oscillator 2 is configured as a thin-walled cylinder the ultrasonic oscillations (deformations) propagate only poorly from the active generator for ultrasonic oscillations 3 (or 4) to the passive generator for ultrasonic oscillations 4 (or 3). Therefore, points 29, 30 of the surfaces 7 and 13 oscillate on lines 34 and 35, which are inclined at the angle α relative to the radial direction (line 33) of the oscillator 2 (see representation 27, 28, FIG. 11). The angle of inclination α is defined by the ratio D/H.

The operating frequency of the driving element 1 or the lower resonance frequency $F_0$ of the cylindrical oscillator 2 (see FIG. 10) is approximately equal to the resonance frequency of the free radial oscillations of the oscillator 2. However, the form of the oscillations of the oscillator 2 is not a radial one as the points of its cylindrical surface 7, 13 do not move in a radial direction, but inclined relative to the radial direction. The shape formed from the paths of motion of the two symmetrical points 29, 30 and the straight lines connecting them represents a trapezoid. Therefore, the waveform of each of the symmetrical pairs of points 29 and 30 of the oscillator generated in the ultrasonic drive according to the invention and the waveform of the overall oscillator 2 can be regarded as a trapezoidal waveform (see representation 27, 28).

The trapezoidal shape of the oscillations of the oscillator 2 generates a longitudinal component motion of the points (29, 30) of the cylindrical surfaces 7, 13, which is directed along the center line L, which, in turn, causes the longitudinal component of the frictional force $F_r$. This force causes the driven element 5 to move in the direction indicated by the arrows 41 in representation 39, 40 of FIG. 11. The oscillation amplitude of the points (29, 30) of the cylindrical surfaces 7, 13, i.e. their oscillation speed V, has a maximum $V_{max}$ on the side of the active generator 3 (4) and a minimum $V_{min}$ on the side of the passive generator 4 (3) of the oscillator 2 (see representation 36, 37, FIG. 11).

As the oscillator 2 in the drive according to the invention is configured as a hollow cylinder, the height H of which is equal to or smaller than the mean diameter D, the resonance frequency of the longitudinal oscillations, relative to the cylinder height F1, is substantially higher (approximately 5 times) than the operating frequency $F_0$ of the drive. This can be learned from the dependencies in FIG. 10. Therefore, there will be no resonance of the longitudinal oscillations, relative to the height in oscillator 2, so that these oscillations are not used for operating the drive.

It follows from these explanations that the trapezoidal oscillations of the oscillator 2, which are generated in the same in an asymmetrical way by excitation of the one or the other (3, 4) of the symmetrically disposed generators for ultrasonic oscillations, e.g. of generator 3 (representation 27, FIG. 11), are the reason why the driven element 5 moves in the drive according to the proposal.

The excitation of the other generator—e.g. of generator 4—causes a sign change of the angle of inclination from α to −α (see representation 28, FIG. 11), which results in a change of the direction of motion of the driven element 5 (see representation 38, 39, FIG. 11) of the drive.

The operating frequencies $F_0$ for oscillators 2 having a diameter of 40 to 10 mm are in the range of 30 to 120 KHz. This means that the oscillation amplitude of the driving elements 1 of the drive according to the invention is approximately 10 times greater (about 4 to 1 micrometers) as compared to the ultrasonic oscillators of the drive known from Document DE 10 2004 059 429 B4.

The oscillator 2 of the drive according to the invention may comprise differently constructed generators for ultrasonic oscillations 3 and 4, so that different kinds for the excitation of oscillations become possible. The embodiment shown in FIG. 5 allows a volume excitation of the oscillator 2. In the embodiment shown in FIG. 6 the electrodes 14 and 15 are provided on only one cylindrical surface 7 or 13 of the oscillator 2. In this case a surface excitation of the oscillator 2 takes place. By using strip-shaped electrodes 17 and 18 it is possible to reduce the excitation voltage for a surface excitation. By using a multilayer structure (FIG. 8) in the form of alternately disposed disc-shaped excitation electrodes 19, 20 and disc-shaped piezoceramic layers 21 it is possible to increase the excitation effectiveness, while the excitation voltage is reduced at the same time. The use of alternately disposed active sections 23 and passive sections 24 (FIG. 9) permits the additional generation of bending oscillations in the oscillator 2. This leads, all in all, to a considerable improvement of the drive.

The use of a thin abrasion-resistant layer 42 (see representation 43, 44, 45, FIG. 12) permits to increase the abrasion resistance of the cylindrical surfaces 7 and 13, which enter into a frictional contact with the driven element 5. The thin abrasion-resistant layer 42 has no negative influence on the oscillator 2, so that it does not distort the form of the oscillations of the oscillator 2.

The use of annular friction elements 48 (see representation 46, 47, FIG. 12), segment-shaped friction elements 49 (see representation 50, 51, FIG. 12) or tooth-shaped friction elements 52 (see representation 53, 54, FIG. 12) allows to substantially increase the working resources of the drive.

As the driving element 1 enters with its inner cylindrical surface 7 or 13 into a frictional contact with the driven element 5, the surface area of the frictional contact in the drive according to the invention is significantly larger as compared to the surface area of the frictional contact in the drive known from Document DE 10 2004 059 429 B4. This substantially increases the holding force upon the impact of external shocks as well the stopping accuracy in a predefined position.

In the embodiments of the drive according to the invention in which the driven element 5 is configured as a round rod 55, a tube 56, 60 or as part of a round rod 61 or as part of a tube 62 (see FIG. 13) it is necessary to apply an external force, which presses the driving element 1 against the driven element 5, as is shown in FIG. 1 or in another way.

In the embodiments of the drive according to the invention in which the driven element 5 is configured as a longitudinally cut round rod or as a longitudinally cut tube 57, 58, 59 the force pressing the driving element 1 against the driven element 5 is generated by the clamping force of the driven element 5.

Figure 13:
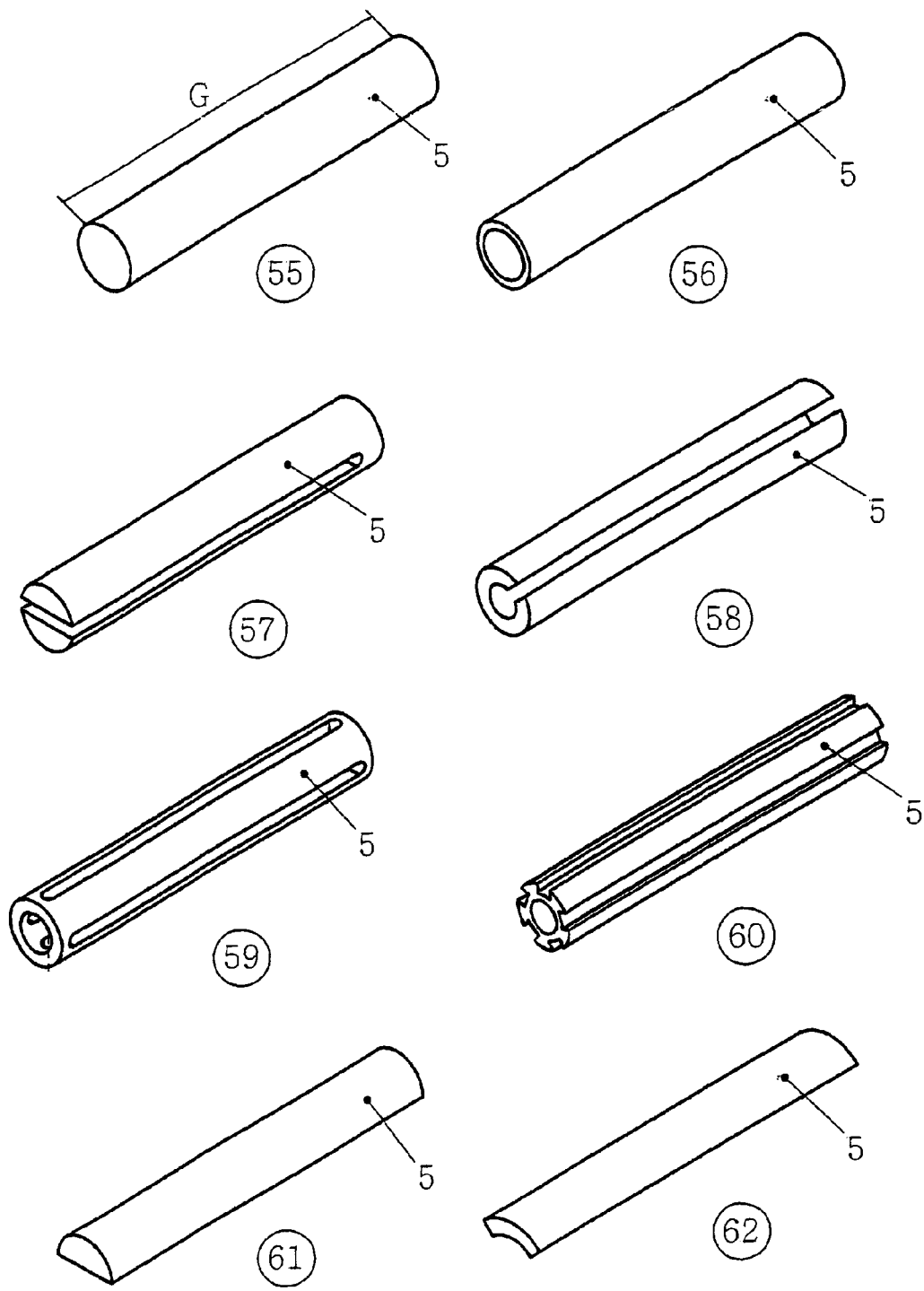
FIG. 13, 14 show different embodiments of the driven elements.
Figure 14:
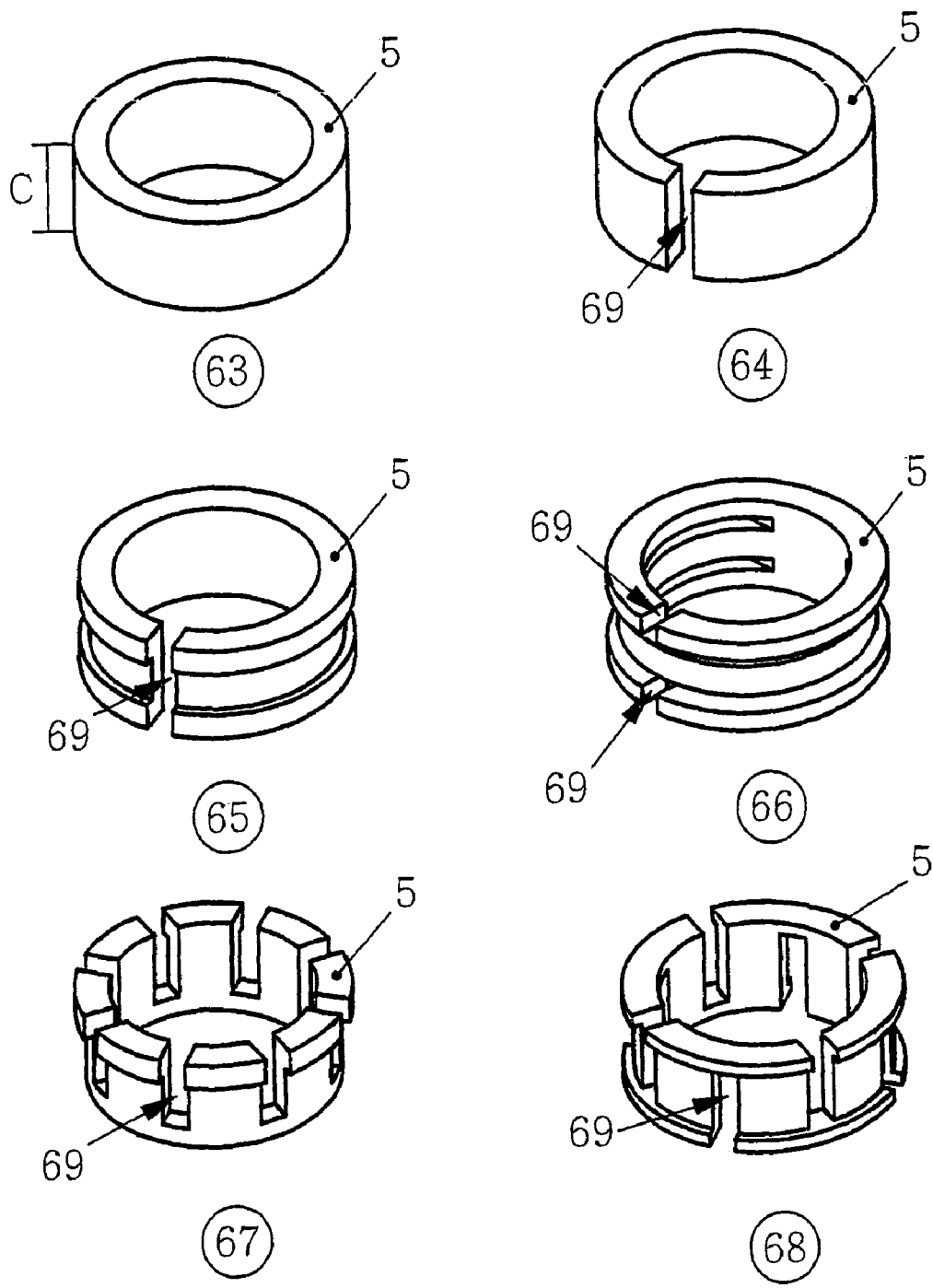

The use of long driven elements 5 (55, 56, 57, 58, 59, 60, 61, 62, FIG. 13) allows to use the driven element 5 as a guide (FIG. 1, 13, 15). In these linear drives the driving element 1 can be configured as a slide moving on the driven element 5.

The use of short driven elements 5 (55, 56, 58, 59, 60, 61, 62, FIG. 13) allows the realization of flat linear drives with short displacement distances of the driven element (FIG. 2, 16, 17). In these linear drives the driven element 5 may be formed of an optical lens or a lens group 75, which focuses the optical object 76—as is shown in FIG. 16, 17—to the optical sensor 77. Drives having long and short driven elements 5 may be combined with each other as is shown in FIG. 18 by means of the construction of the objective.

As the driving element 1 in the drive according to the invention has a sufficiently great oscillation amplitude (approximately 1 to 4 micrometers), the driven element 5 may be manufactured from abrasion-resistant plastic materials (e.g. by injection molding). This substantially simplifies the technology of manufacturing the drives according to the invention and permits a cost-efficient fabrication of these drives.

As only one resonance of the ultrasonic oscillations is made use of in the drive according to the invention, in order for the frequency of the electrical excitation voltage U, which is equal to the working frequency $F_0$, to be automatically maintained, the electrical excitation source 12 may be configured according to the principle of the self-exciting autogenerator, where the excitation frequency is predefined by the resonance frequency of the generator for ultrasonic oscillations 3 or 4 of the oscillator 2 connected to the same (see FIG. 19).

Such an excitation source 12 (see FIG. 19) works as follows. When switching on the drive, the signal source of the feedback circuit 94 generates a feedback signal which is proportional with respect to the oscillation speed of the oscillator 2. Here, two cases are conceivable:

In the first case, the feedback signal represents a voltage which is proportional with respect to the current I flowing through the oscillator 2 (FIG. 20).

In the second case, the feedback signal is an electrical voltage U which is generated by the switched off electrode 9 (FIG. 21).

The feedback signal is applied to the input of the feedback circuit 86. Subsequently, the signal is filtered by filter 87, its phase is corrected by means of the phase shifter 88, and the amplitude is amplified by the signal amplifier 89. Then, the signal is supplied via the on-off switch 90 to the amplifier component 84 of the power amplifier 83. The power amplifier 83 generates an electrical voltage which is supplied by means of the tuning circuit 85 to the general electrode 10 of the oscillator 2.

The phase shifter 88 and the signal amplifier 89 balance the circuit in such a way that, at the operating frequency $F_0$, the phase shift in the feedback circuit is equal to zero so that the amplification coefficient is greater than one. The observance of this balance condition is guaranteed by the excitation of the circuit at the frequency $F_0$.

By configuring the excitation source 12 as a self-exciting autogenerator, whose excitation frequency is predefined by the resonance frequency of the generator for ultrasonic oscillations 3 or 4 connected to the same, it is possible to stabilize the drive in a broad temperature range. Switching off the feedback signal from the power amplifier 83 by means of the on-off switch 90 results in the termination of the excitation of the circuit, which causes the drive to stop. The excitation source 12 according to the invention allows one, two or more of the driving elements 1 to be connected to the same, as is shown in FIG. 19.

Each of the generators 3 or 4 of each of the driving elements 1 is connected with the excitation source 12 by the change-over switch 92, that is, by applying a control voltage to its control inputs 93. If the drive according to the invention is provided with a digital frequency controller 97, the position of the driven element in such a drive can be predefined precisely. To this end, a signal switching on the drive is applied to the control inputs 98, and a signal generated by the sensor 77 or the position generator of the driven element 5 (generator not included in FIG. 22) and stopping the drive is supplied to the positioning inputs 99.

Below, the positive effect achieved with the solution to the aforementioned objects will be described.

As the driving element of the drive according to the invention is configured as a thin hollow cylinder it is possible that the driving element comprises the driven element, which, again, permits a reduction of the volume of the drive. As the height of the cylindrical driving element in the drive according to the invention is equal to or smaller than its diameter it is possible to build flat apparatus. These two aspects are particularly important for apparatus comprising optical systems, which are used, for example, in mobile end user devices such as mobile phones or cameras.

Moreover, the drive according to the invention has a substantially greater holding force than the prior devices. This means that such a drive is considerably more resistant to external impacts than the prior devices. Also, the great holding force allows a higher precision in stopping the driven element as compared to prior drives, which is particularly important for the use of the drive in exact positioning systems. The great holding force increases the operational safety of the drive.

As the drive according to the invention also has a smaller operating frequency, the oscillation amplitude of the driving element is increased. This greater oscillation amplitude allows the use of driven elements made of plastic materials. The latter substantially simplifies the technology of manufacturing the drives, thereby reducing the fabrication costs thereof. In addition, the lower operating frequency reduces the electrical losses in the excitation source. Furthermore, the drive according to the invention does not generate any acoustic noises, as is the case in drives comprising gear drives. Thus, all enumerated positive effects essentially contribute to broadening the application spectrum of the ultrasonic linear drive according to the invention.

LIST OF REFERENCE NUMBERS 1 driving element
2 ultrasonic oscillator of the driving element 1
3, 4 generators for the ultrasonic oscillations of the oscillator 2
5 driven element
6 supports
7 inner cylindrical surface of the driving element 1 (oscillator 2)
8 load
9, 10 connections of the generators 3, 4
11 direction selector switch
12 electrical excitation source of the driving element 1 (oscillator 2)
13 outer cylindrical surface of the driving element 1 (oscillator 2)
14 annular excitation electrode of the generator 3 or 4
15 general electrode of the generators 3, 4
16 end faces of the oscillator 2
17, 18 strip-shaped electrodes of the generators 3 and 4
19 disc-shaped excitation electrodes of the generators 3 and 4
20 general disc-shaped electrodes of the generators 3 and 4
21 disc-shaped layers made of piezoelectric ceramics
22 representation to explain the direction of polarization of the layers made of piezoelectric ceramics
23 active sections of the generators 3 and 4
24 passive sections of the generators 3 and 4
25 representation to explain the frequency dependence of the resistance Z of the generators 3 and 4
26 representation to explain the frequency dependence of the phase shift between the electrical voltage and the current of the generator 3 or 4
27, 28 radial sections of the oscillator 2
29, 30 points of the cylindrical surfaces 7, 13 of the oscillator
31, 32 paths of motion of points 29, 30
33 lines indicating the radial direction
34, 35 lines indicating the direction of motion of points 29, 30
36, 37 representations to explain the graphic representation of the dependence of the oscillation speed V of the points 7 or 13 on their position lengthways of height H of the oscillator 2
38, 39 representations to explain the direction of motion of the driven elements 5
40, 41 arrows to explain the direction of motion of the driven elements 5
42 abrasion-resistant layer
43, 44, 45 representation to explain the configuration of the abrasion-resistant layer 42
46, 47 representations to explain the configuration of the friction elements 48
48 annular friction elements of the oscillator 2
49 segment-shaped friction elements of the oscillator 2
50, 51 representations to explain the configuration of the segment-shaped friction elements 49 of the oscillator 2
52 tooth-shaped friction elements of the oscillator 2
53, 54 representations to explain the configuration of the tooth-shaped friction elements of the oscillator 2
55-62 representations to explain possible shapes of long driven elements
63-69 representations to explain possible shapes of short driven elements
70, 71, 72 design modifications of the drive according to the invention
73 holder
74 sound-insulating intermediate layer
75 optical lens or a group of optical lenses
76 optical object
77 optoelectric sensor
78 housing of the optical objective
79, 80 ultrasonic drives for the optical objective
81 focusing lens group
82 zoom lens group
83 power amplifier
84 amplifier component of the power amplifier 83
85 tuning circuit of the power amplifier 83
86 feedback circuit
87 filter of the feedback circuit 86
88 phase shifter of the feedback circuit 86
89 signal amplifier of the feedback circuit 86
90 on-off switch of the feedback circuit 86
91 control input of the on-off switch 90
92 change-over switch 11
93 control inputs of the change-over switch 11
94 signal source of the feed back circuit
95 resistor of the signal source 94
96 capacitor of the signal source 94
97 digital frequency controller
98 control inputs of the digital frequency controller
99 positioning inputs of the digital frequency controller

The invention claimed is:

1. Ultrasonic linear drive, comprising a driving element (1) as ultrasonic oscillator (2) with two generators (3, 4) for ultrasonic oscillations, and a driven element (5) which produces a frictional contact with the driving element (1), and an electrical excitation source (12) for the driving element (1), characterized in that the ultrasonic oscillator (2) is configured as a hollow thin-walled piezoelectric cylinder, the height H of which is equal to or smaller than the mean diameter D thereof, and the generators (3, 4) for ultrasonic oscillations are symmetrically disposed on both sides relative to the sectional plane S which extends through the center of the height of the ultrasonic oscillator (2) perpendicular to the center line L thereof, wherein the cylinder surface of the driving element (1) is in contact with the driven element (5) and the electrical excitation source (12) is connected to the ultrasonic linear drive to excite only the first or the second generator (3, 4) for ultrasonic oscillations.

2. Ultrasonic linear drive according to claim 1, characterized in that
the driving element (1) produces with its inner cylindrical surface (7) a frictional contact with the driven element (5).

3. Ultrasonic linear drive according to claim 1, characterized in that
the driving element (1) produces with its outer cylindrical surface (13) a frictional contact with the driven element (5).

4. Ultrasonic linear drive according to claim 1, characterized in that
each of the generators (3, 4) for ultrasonic oscillations is configured as an excited annular electrode (14) and a general annular electrode (15), wherein the excitation electrodes (14) are disposed on one of the cylindrical surfaces of the radially polarized oscillator, symmetrically on both sides of the sectional plane S, and the general electrode (15) is disposed underneath the excitation electrodes (14) on the other cylindrical surface of the oscillator.

5. Ultrasonic linear drive according to claim 1, characterized in that
each of the generators (3, 4) for ultrasonic oscillations is configured as an excited annular electrode (14) and an excited general annular electrode (15), wherein the excitation electrodes (14) are disposed on one of the cylindrical surfaces of the longitudinally polarized oscillator near the end faces (16) thereof and symmetrically with respect to the sectional plane, and the general electrode (15) is disposed on the same surface of the oscillator at its point of intersection with the sectional plane.

6. Ultrasonic linear drive according to claim 1, characterized in that
each of the generators (3, 4) for ultrasonic oscillations is configured in the form of alternate strip-shaped electrodes (17, 18), which are disposed on a cylindrical surface of the oscillator alternately polarized in the longitudinal direction.

7. Ultrasonic linear drive according to claim 1, characterized in that
each of the generators (3, 4) for ultrasonic oscillations is comprised of coaxially disposed disc-shaped electrodes (19), which take turns with thin disc-shaped layers (21) of piezoelectric ceramics polarized in the longitudinal direction.

8. Ultrasonic linear drive according to claim 1, characterized in that
each of the generators (3, 4) for ultrasonic oscillations is formed of an even number of alternate active (23) and passive sections (24).

9. Ultrasonic linear drive according to claim 1, characterized in that
the generator for ultrasonic oscillations has an abrasion-resistant layer (42) on one of its cylindrical surfaces by means of which it produces a frictional contact with the driven element (5).

10. Ultrasonic linear drive according to claim 1, characterized in that
the generator for ultrasonic oscillations has one or two annular friction elements (48) by means of which it produces a frictional contact with the driven element (5).

11. Ultrasonic linear drive according to claim 1, characterized in that
the generator for ultrasonic oscillations has one or more segment-shaped friction elements (49) by means of which it produces a frictional contact with the driven element.

12. Ultrasonic linear drive according to claim 1, characterized in that
the driven element (5) has the shape of a round rod (55) or a tube (56), and the parts of a round rod or a tube (63) or of the longitudinally cut round rod or the longitudinally cut tube (57, 58, 59, 60) or the longitudinally cut parts of the round rod (61) or longitudinally cut parts of the tube (62) have this or another suitable shape.

13. Ultrasonic linear drive according to claim 1, characterized in that
the driven element (5) includes an abrasion-resistant plastic material and is preferably made of same.

14. Ultrasonic linear drive according to claim 1, characterized in that
an optical lens or an optical lens group or another driven part of an apparatus is disposed inside the driven element (5) or the driving element (1).

15. Ultrasonic linear drive according to claim 1, characterized in that
the excitation source (12) for the driving element (1) is configured as a self-exciting autogenerator, whose excitation frequency is predefined by the resonance frequency of the generator for ultrasonic oscillations of the excited oscillator connected to same.

16. Ultrasonic linear drive according to claim 1, characterized in that
the ultrasonic linear drive is equipped with a digital frequency controller (97) for the electrical excitation source (12), which predefines the position of the driven element (5).

17. Ultrasonic linear drive according to claim 2, characterized in that
each of the generators (3, 4) for ultrasonic oscillations is configured as an excited annular electrode (14) and a general annular electrode (15), wherein the excitation electrodes (14) are disposed on one of the cylindrical surfaces of the radially polarized oscillator, symmetrically on both sides of the sectional plane S, and the general electrode (15) is disposed underneath the excitation electrodes (14) on the other cylindrical surface of the oscillator.

18. Ultrasonic linear drive according to claim 3, characterized in that
each of the generators (3, 4) for ultrasonic oscillations is configured as an excited annular electrode (14) and a general annular electrode (15), wherein the excitation electrodes (14) are disposed on one of the cylindrical surfaces of the radially polarized oscillator, symmetrically on both sides of the sectional plane S, and the general electrode (15) is disposed underneath the excitation electrodes (14) on the other cylindrical surface of the oscillator.

19. Ultrasonic linear drive according to claim 2, characterized in that
each of the generators (3, 4) for ultrasonic oscillations is configured as an excited annular electrode (14) and an excited general annular electrode (15), wherein the excitation electrodes (14) are disposed on one of the cylindrical surfaces of the longitudinally polarized oscillator near the end faces (16) thereof and symmetrically with respect to the sectional plane, and the general electrode (15) is disposed on the same surface of the oscillator at its point of intersection with the sectional plane.

20. Ultrasonic linear drive according to claim 3, characterized in that
each of the generators (3, 4) for ultrasonic oscillations is configured as an excited annular electrode (14) and an excited general annular electrode (15), wherein the excitation electrodes (14) are disposed on one of the cylindrical surfaces of the longitudinally polarized oscillator near the end faces (16) thereof and symmetrically with respect to the sectional plane, and the general electrode (15) is disposed on the same surface of the oscillator at its point of intersection with the sectional plane.

* * * * *